United States Patent [19]

Perkut

[11] 4,414,831
[45] Nov. 15, 1983

[54] KEY-OPERATED LOCK

[76] Inventor: B. R. Perkut, Jochbergstr. 10, Benediktbeuern, Fed. Rep. of Germany, D-8174

[21] Appl. No.: 253,529

[22] PCT Filed: Aug. 14, 1980

[86] PCT No.: PCT/DE80/00120
§ 371 Date: Apr. 15, 1981
§ 102(e) Date: Apr. 15, 1981

[87] PCT Pub. No.: WO81/00586
PCT Pub. Date: Mar. 5, 1981

[30] Foreign Application Priority Data

Aug. 17, 1979 [DE] Fed. Rep. of Germany ....... 2933453

[51] Int. Cl.³ .................. E05B 47/00; E05B 49/00
[52] U.S. Cl. .................................. 70/276; 70/278; 70/413
[58] Field of Search ............... 70/276, 277, 278, 413; 235/450, 474; 318/254; 271/149; 365/158, 170

[56] References Cited

U.S. PATENT DOCUMENTS 3,896,292 7/1975 May ................................. 235/450

FOREIGN PATENT DOCUMENTS 2724025 12/1977 Fed. Rep. of Germany ........ 70/276
2026081 1/1980 United Kingdom ................. 70/276

Primary Examiner—Robert L. Wolfe
Attorney, Agent, or Firm—Michael J. Striker

[57] ABSTRACT

A key-operated lock, which comprises a reading head with a Hall generator, whereby the key is provided with magnetically readable data locations each of which forms at least a dual code. Between the individual data locations, magnetically readable time pulse planes are located. The data locations are represented by coded segments of soft magnetic material or permanent magnets. The timing pulse planes are either represented by these coded segments or are identified by the Hall generator in that the inductance between successive data locations drops to a value close to zero without rendering necessary any coded segments. Furthermore, circuits are described for analyzing the signal voltages supplied by the Hall generator for receiving clear signals or blocking signals for the lock.

22 Claims, 70 Drawing Figures

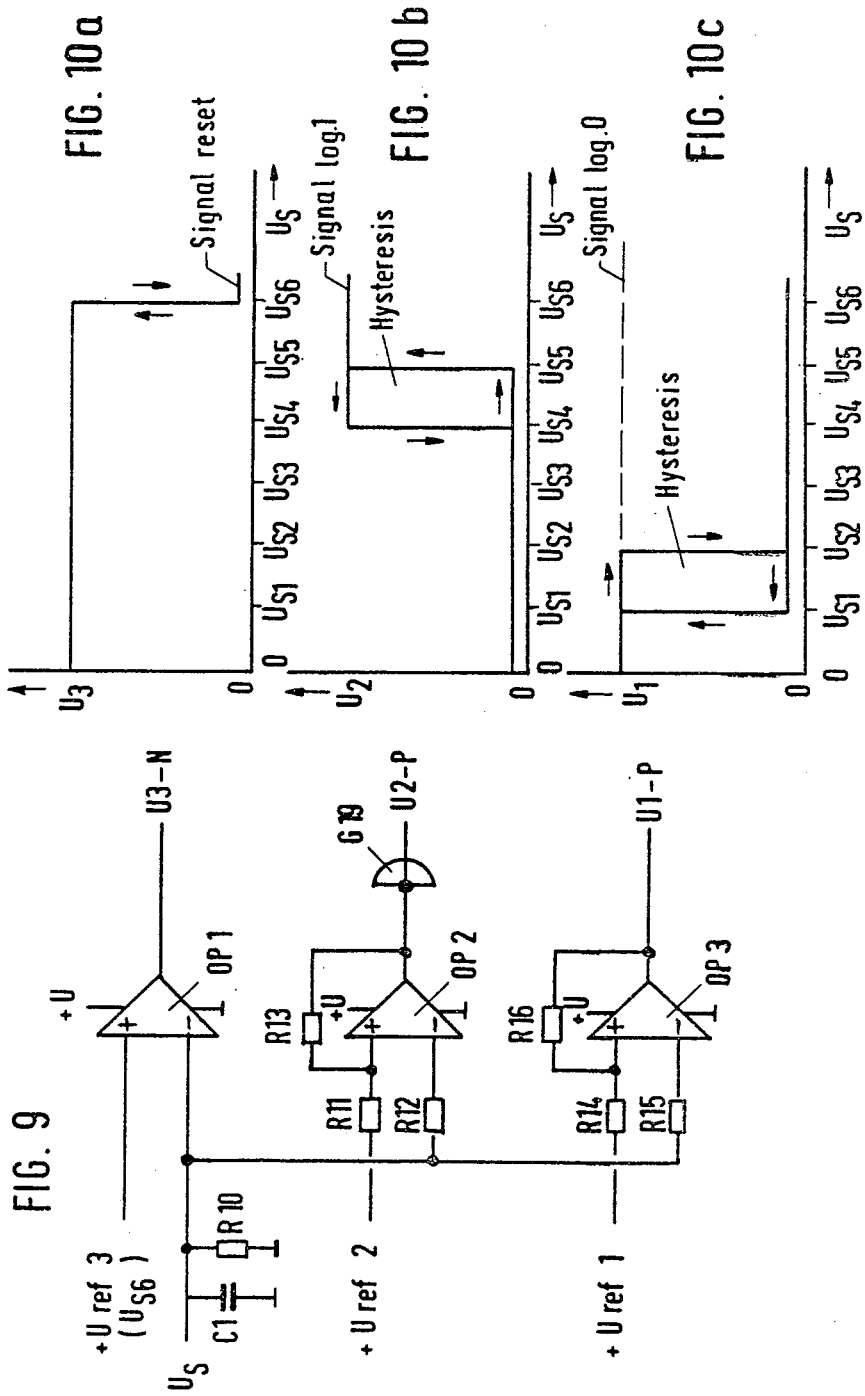

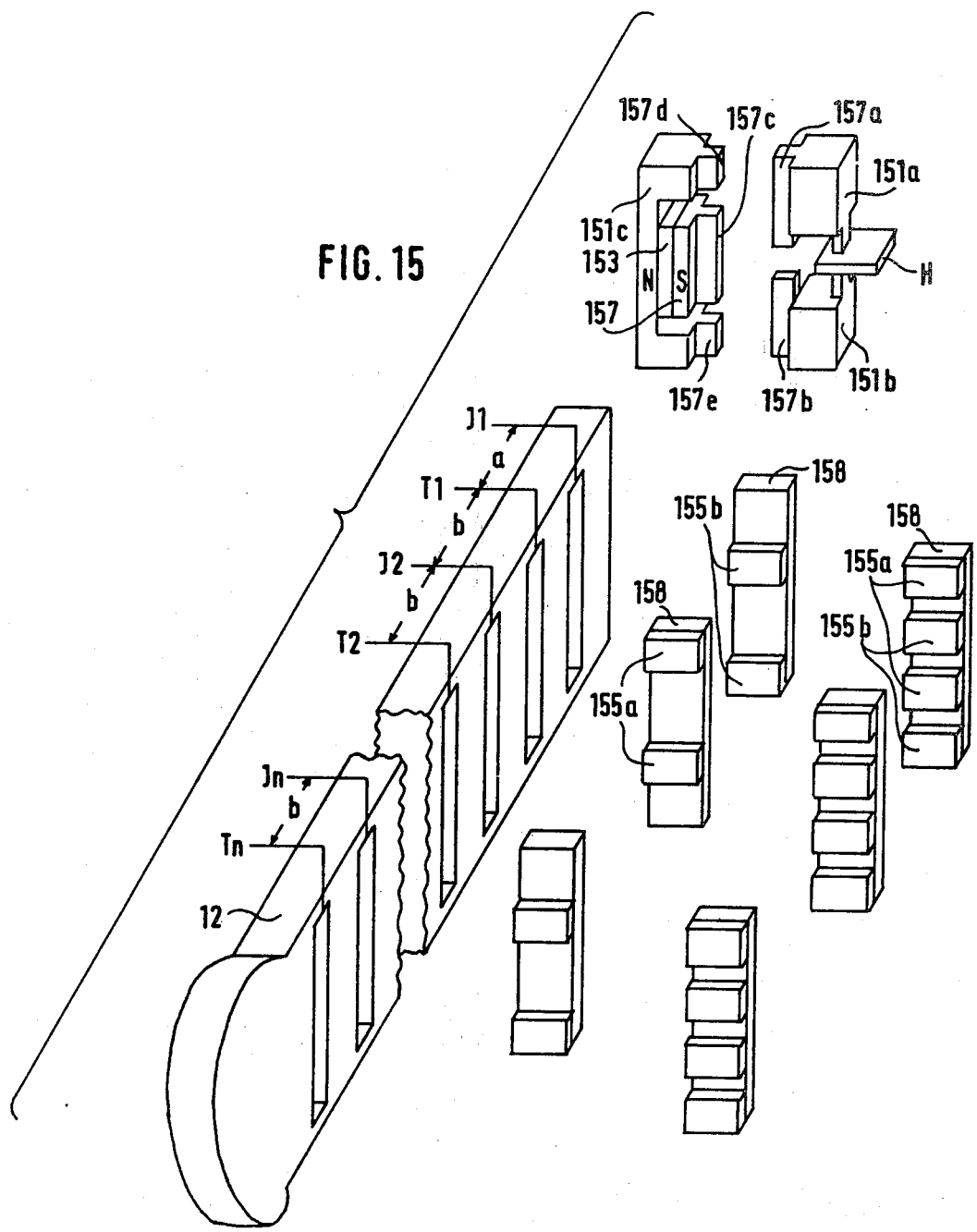

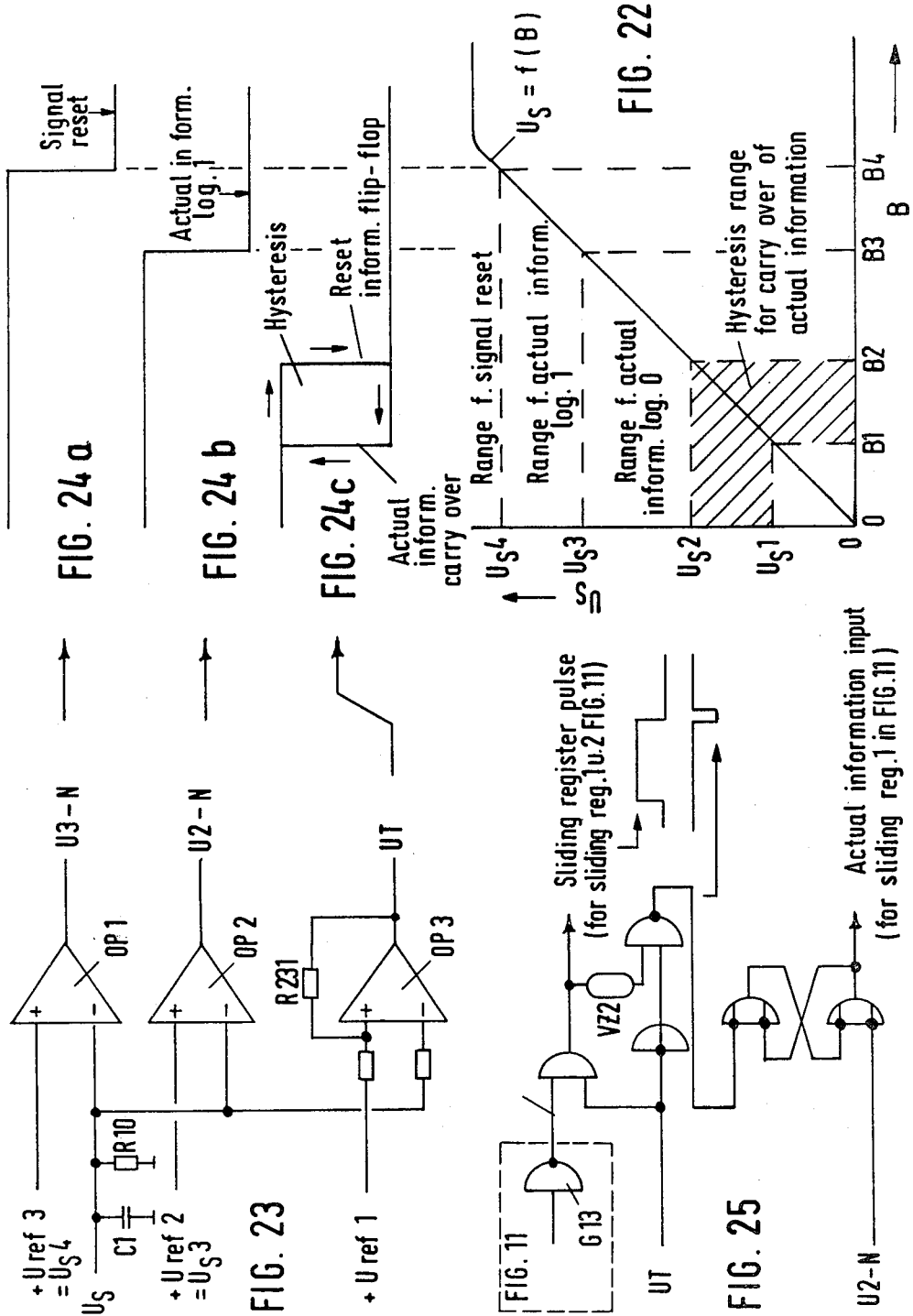

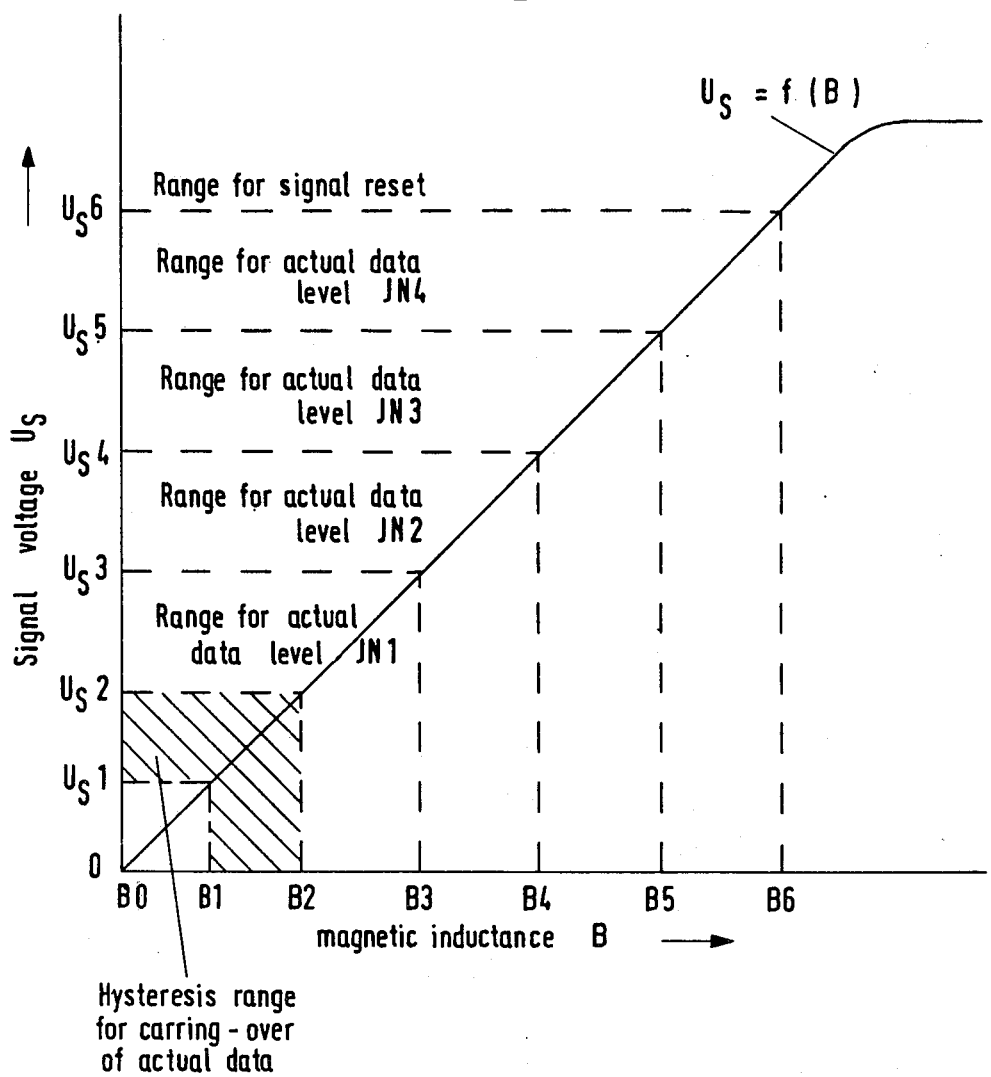

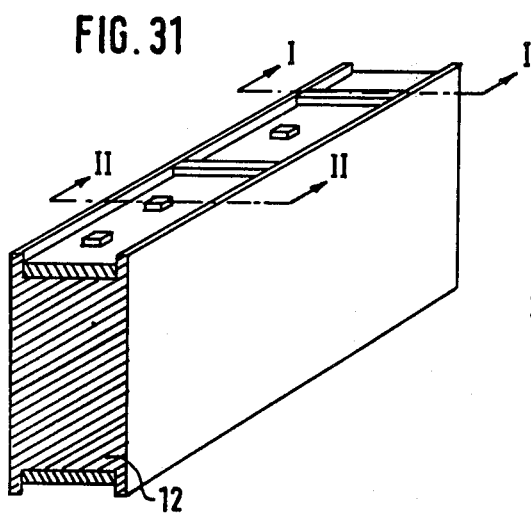
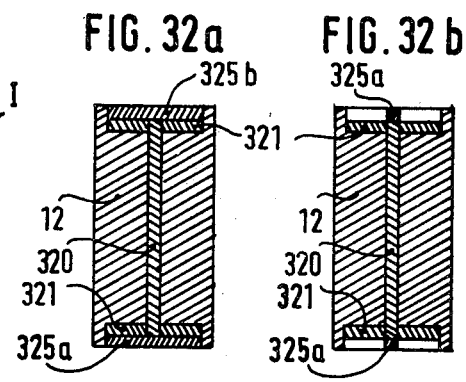
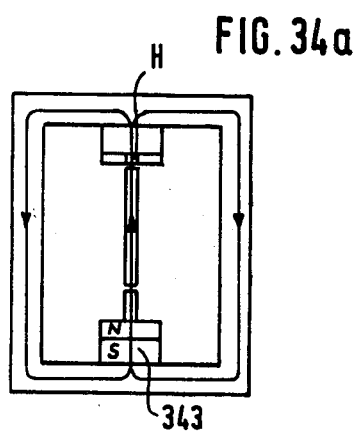
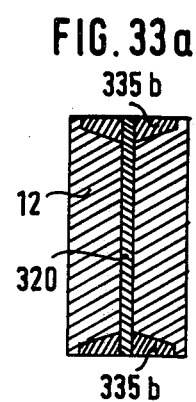
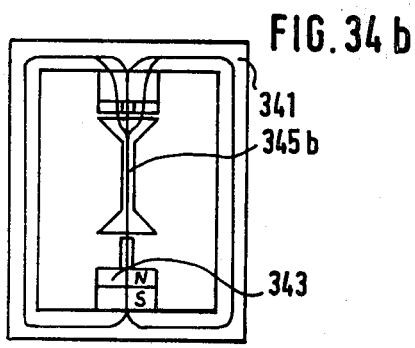
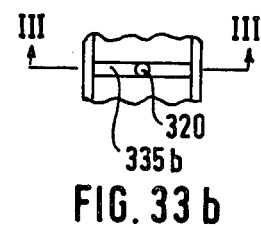

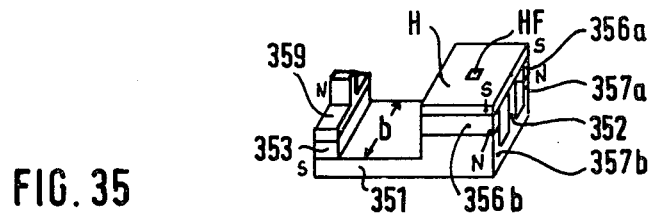
FIG. 35
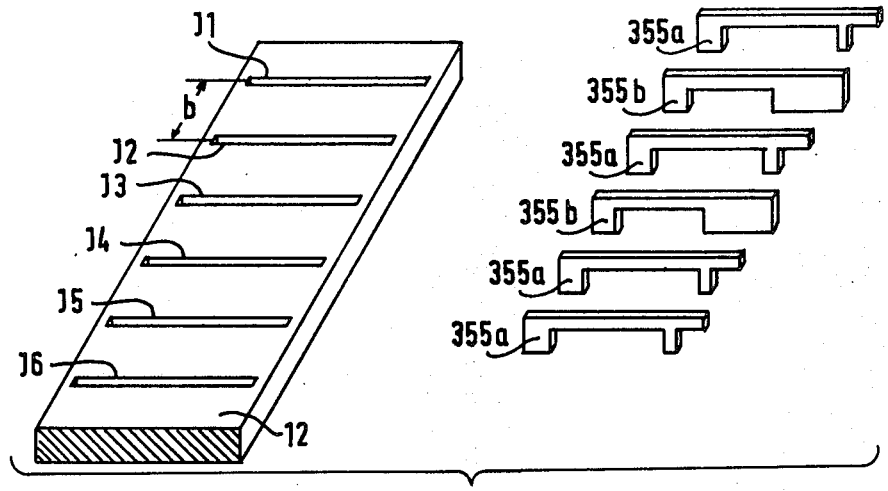
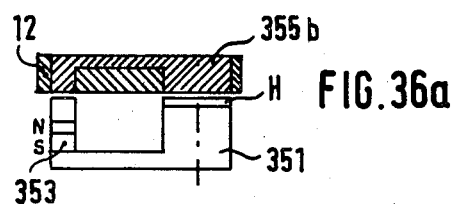
FIG. 36a
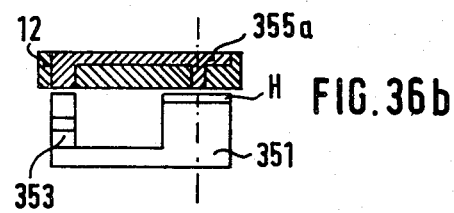
FIG. 36b
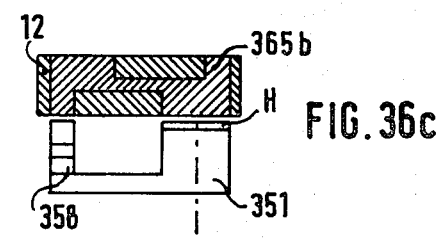
FIG. 36c
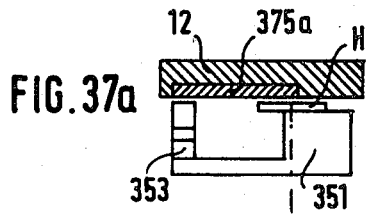
FIG. 37a
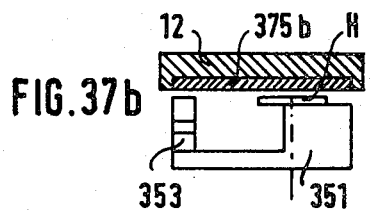
FIG. 37b
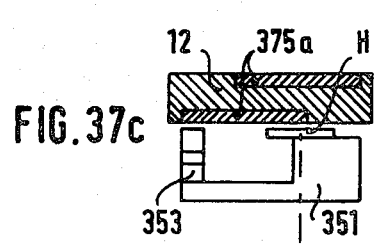
FIG. 37c

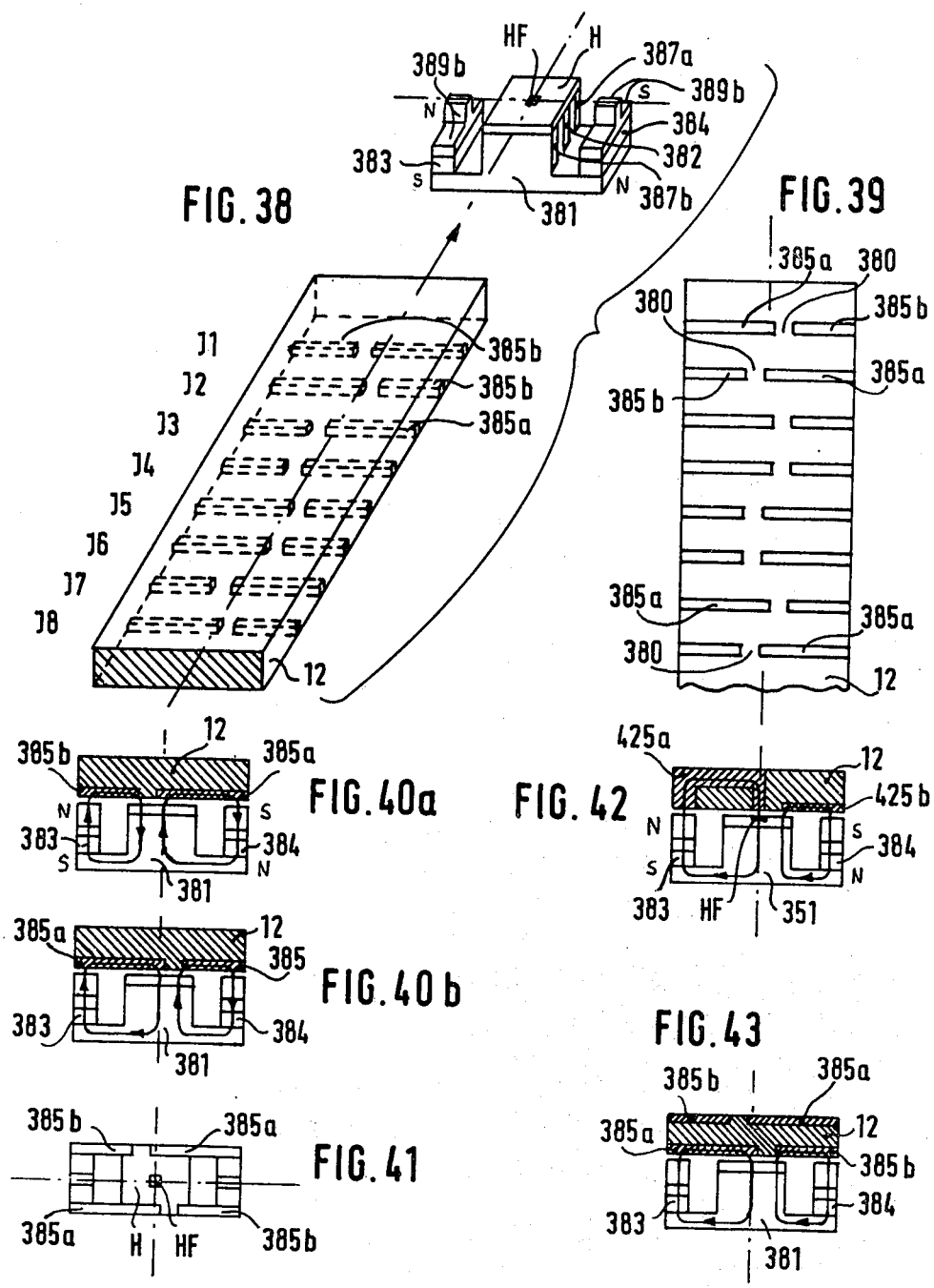

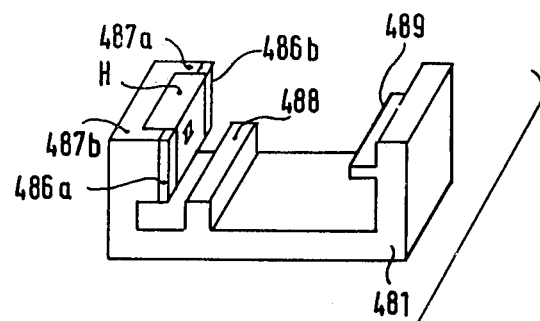
FIG. 48
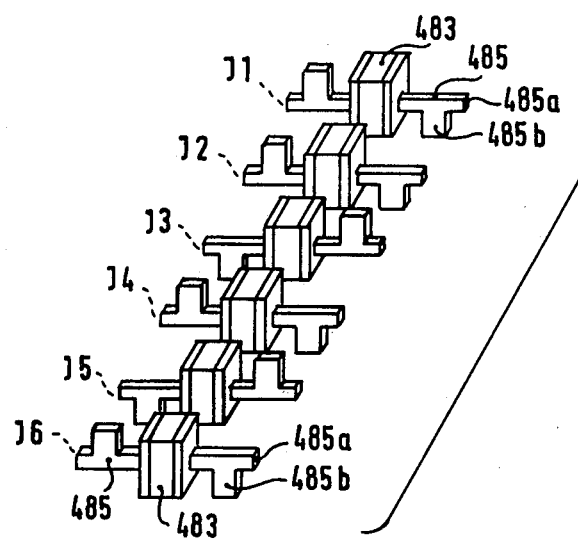
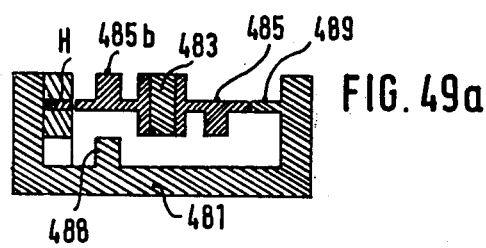
FIG. 49a
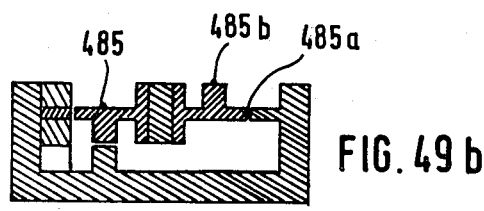
FIG. 49b
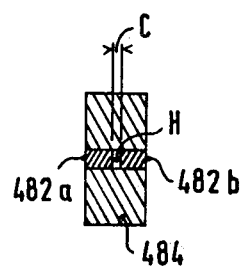
FIG. 50

KEY-OPERATED LOCK

The invention relates to a key-operated lock, comprising a reading head with a Hall generator, the magnetic inductance of said Hall generator varying in dependence upon the position of the key provided along its axis with successively arranged magnetically readable data locations, wherein the signal voltage of said key, which depends upon the momentary value of the inductance, is being compared by a receiving circuit with stored data as set, the receiver circuit, in case of matching data, actuating the mechanical latching arrangement of the lock.

A lock of this type is known from DE-OS No. 25 46 542. This lock as known will however, when operating with a Hall generator, allow only a very limited degree of encodability, since the Hall generator can only determine how many individually separated magnetic zones are present on the key body. The determined number of magnetic data is then, after conversion into a corresponding number of electrical pulses, compared in the receiving circuit with a stored number that represents the data as set. The key of the known lock may be provided with an additional timing-pulse track in order to control the moments of sensing during which the Hall generator carries over the data formed by the magnetic zones and supplies these to the receiving circuit. Such a timing-pulse track will, however, increase the expenditure for lock and key, irrespective of readout being made mechanically, magnetically or electro-optically.

The invention is based upon the task of making available a key-operated lock of the aforenoted category, which will allow a high degree of encodability, i.e. a great number of different combinations, whilst requiring only low expenditure for production of the key, and a small quantity of electronic components for the lock.

As per invention, this task is solved by each magnetically readable data location on the key forming, at minimum, a bivalent (dual) code, and by each data location being succeeded by a magnetically readable timing-pulse plane controlling the processing in the receiving circuit of the data location previously read out by the Hall generator in the reading head.

It will be possible in this manner to obtain with a key body of equal length a manifold increase in the degree of encodability when composed to the known lock and key, this increase resulting on one hand by each data location being able to assume two values (code numbers), i.e. the logical zero and the logical one, but in case of need also two or more values (code numbers), while on the other hand the length occupied on the key body by each data location may be kept particularly small due to the presence of the timing-pulse planes, without however, requiring a separate timing-pulse track with its aforenoted disadvantages.

The subordinate claims contain advantageous embodiments of the lock and key as per invention.

The invention is explained below with the aid of the drawing containing the embodiments selected as examples, partially in schematic simplification, and also explanatory diagrams and circuit diagrams. Shown in:

FIG. 1: a first embodiment of the reading head within the lock as well as the appurtenant key body, in a schematic simplification, FIGS. 2 to 6: the position of the coded segments within the reading head as per FIG. 1, at various positions of the key body, FIG. 7: the circuitry for generating the signal voltage of the Hall generator, FIG. 8: a diagram for the signal voltage in dependence upon inductance by the Hall generator, FIG. 9: a circuit for obtaining logical voltage levels from the signal circuitry, FIGS. 10a to 10c: diagrams of voltage levels in dependence upon the signal voltage, FIG. 11: a circuit for comparing actual values of the voltage levels with the stored predetermined values, FIG. 12: diagrams of, respectively, signal or voltage levels occurring in circuitry as per FIGS. 7, 9 and 11, FIG. 13: a further embodiment of the reading head with appurtenant key, FIGS. 14a to 14b: top views onto the reading head as per FIG. 13 at various positions of the coded segments, FIG. 15: a further embodiment of the reading head with key, FIGS. 16a to 16c: a top view onto the reading head as per FIG. 15 at various positions of the coded segments, FIGS. 17, 17a: a further embodiment of the reading head with key, FIGS. 18, 19: cuts through the reading head as per FIG. 17 at various positions of the key body, FIG. 20: a cut through a reading head, similar to FIG. 17, FIGS. 21a, 21b: top views onto the reading head as per FIG. 20 at two different positions of the coded segments, FIG. 22: a diagram for the signal voltage in dependence upon inductance through the Hall generator for the embodiment as per FIGS. 17 to 21b, FIG. 23: a circuit for obtaining logical voltage levels from the signal voltage, FIG. 24: a diagram for the logical voltage levels, FIG. 25: a circuit for the subsequent processing of logical voltage levels, FIG. 26: diagrams for the various voltage levels in dependence upon the position of the key, FIG. 27: a diagram corresponding to FIG. 26, representing the voltage levels in case of using a quadrivalent code for each data location, FIG. 28: a diagram for the signal voltage in dependence upon the magnetic inductance through the Hall generator when using a quadrivalent code, FIG. 29: a diagram for the processing of the signal voltage into logical voltage levels and their progress in dependence upon the signal voltage, FIG. 30: a circuit for further processing of the logical voltage levels, FIG. 31: a further embodiment of the key body, FIG. 32a: a cut along line I—I through a key body as per FIG. 31, FIG. 32b: a cut along line II—II through a key body as per FIG. 31, FIG. 33a: a cut through a somewhat modified key body similar to FIG. 31, FIG. 33b: a top view onto the key body as per FIG. 33a, FIGS. 34a 34b: top views onto a reading head for the key body as per FIGS. 31 to 33b, FIG. 35: a further embodiment of the reading head and key, FIGS. 36a, 36b: views of the reading head as per FIG. 35, in two different positions of the coded segments, FIG. 36c: a view of the reading head as per FIG. 35 with a coded segment in unfolded symmetry, FIGS. 37a, 37b: the same reading head with a simplified embodiment of the coded segments, FIG. 37c: the same reading head with two simplified coded segments arranged in unfolded symmetry, FIG. 38: a further embodiment of the reading head with key, FIG. 39: a view of the key body of FIG. 38 from below, FIGS. 40a, 40b: the reading head as per FIG. 38 at two positions of the key body, FIG. 41: a top view onto the reading head as per FIG. 38, FIG. 42: the reading head as per FIG. 38 with a modified embodiment of the coded segments, FIG. 43: the reading head as per FIG. 38 with coded segments arranged in unfolded symmetry, FIG. 44: a further embodiment of the reading head with key body, FIGS. 45a, 45b: a cut through the reading head as per FIG. 44 at two positions of the coded segments, FIG. 46: a further embodiment of the key body as per FIG. 44, FIG. 47: an enlarged cut representation of the zone of the reading head as per FIG. 44, containing the Hall generator, FIG. 48: a further embodiment of the reading head with key body, FIGS. 49a, 49b: a cut through the reading head as per FIG. 48 at two positions of the coded segment and FIG. 50: an enlarged cut representation of the zone of the reading head as per FIG. 48, containing the Hall generator.

The figures show only those respective components of the lock with key that are required to understand the invention, i.e. the reading head of the lock and a portion of the key body.

FIG. 1 shows a reading head consisting of a magnetically conductive yoke provided at its center with a rectangular opening for introduction of a key body 12 also of rectangular cross section. The yoke consists of flux-conducting sections 11a, 11b, 11c as well as two magnets 13, 14, arranged in mutual symmetry, with their magnetic axes oriented toward each other according to the indicated poles S and N. The very small magnet-sensitive surface of a Hall generator H, is located between the flux-conducting sections 11b and 11c, but is not visible in the figure. The connections for the supply voltage and the signal voltage of the Hall generator are not shown.

The key body 12 consists of nonmagnetic material and carries the data locations I1, I2, succeeded, respectively, by a time-pulse plane T1, T2. At the data locations, the key body 12 is intersected by a coded segment 15a, 15b made of any desired soft-magnetic material. The encoding corresponds to a bivalent (dual) code. Each data location may thus be either of the logical value zero (hereafter log. 0), or the logical value one (hereafter log. 1). The code number log 0 or log. 1 is differentiated by the position of the coded segment within one data location, assignment ensuing in principle at will. The data location I1 with coded segment 15a may, herein, signify log. 1, the data location I2 with coded segment 15b may signify log. 0.

The time-pulse planes T1, T2 are different from the data locations by being occupied by both coded segments 15a, 15b. The key body may, furthermore, like a conventional key, be provided at both free narrow sides with notches, milled slots or similar, that may cooperate with corresponding mechanical tumblers in the lock. These parts are not shown, since they are previous art and in no way related to the invention.

Upon introduction of the key body as per FIG. 1 into the yoke of the reading head, the states of magnetic flux in the yoke and through the Hall generator H as shown in FIGS. 2 to 5, will obtain in succession. As illustrated by the lines of flux, the code numbers log. 1 (FIG. 2) and log. 0 (FIG. 4), are differing insofar as the Hall generator is once subjected to magnetic flux in one direction and then in the opposite direction. The coded segments 15a, 15b will at the data locations such shunts that are, in the respective instances, assymetrical relative to the Hall generator H. The time-pulse planes are, however, recognizable by the fact that at the respective positions of the key body (FIGS. 3 and 5), there will be no magnetic flux through the Hall generator, since the coded segments 15a, 15b, will effect shunts that are symmetrical relative to the Hall generator.

For generation of a resetting pulse for the receiving circuit arranged subsequent to the reading head, the first data location I1 is provided with special identification. This may be effected as per FIG. 1 by making the distance a between the first data location I1 and the time-pulse plane T1 larger than the distances b between the subsequent time-pulse planes and data locations. Higher inductance for data location I1 in, or, respectively, through, Hall generator H will result even without such a measure, since the magnetic flux generated by the data location I1 is attenuated only by one time-pulse plane, whilst the magnetic flux caused by all subsequent data locations will be attenuated by the coded segment not only of the preceding time-pulse plane, but also of that subsequently arranged. An enlarged distance a will, however, further enhance this effect. The inductance through the Hall generator, caused by the first data location, may further be increased as per FIG. 6, by the first coded segment 15c having a cross-sectional area larger than that of all remaining coded segments 15a, 15b. The higher inductance will result in a particularly high signal voltage by which the first data location I1 will be identified.

The Hall generator will preferably be a component of a Hall generator module as shown in FIG. 7 (f.i. SAS 231 L of Siemens AG), containing the requisite circuitry for operating the Hall generator, for amplifying the inductance-sensitive Hall voltage, for zero balancing and for sensitivity balancing (gradient), merely requiring an operating voltage $+U$ of, for instance, 12 volts, which will supply the signal voltage $U_S$. For a reading head as per FIG. 1, the signal voltage $U_S$ for a magnetic inductance $B=0$ is set by means of a potentiometer P1 to the value $U_{S\ max}/2$, so that at the maximum value of the magnetic inductance B through the Hall generator in one direction, the signal voltage will attain the value $U_S=0$, whilst it will attain the value $U_{S\ max}$ at same inductance but in the opposite direction through the Hall generator. The sensitivity of the Hall generator module is set by means of a potentiometer P2 to a suitable value of, for instance, $U_{S\ max}=10$ volt for a magnetic inductance $+B\ max=100$ m tesla.

The concatenation between signal voltage $U_S$ and induction B through the Hall generator is obtained in this manner and depicted in FIG. 8. The requisite tolerance ranges must be predetermined in order to obtain a signal-to-noise ratio adequate to allow recognizing of code numbers and timing-pulse planes. An inductance $B<-B_2$ corresponding to a signal voltage $U_S<U_{S1}$ will, for instance, be recognized as log. 0, an inductance $B>B_2$, corresponding to $U_S>U_{S5}$, will be recognized as log. 1, $-B_1<B<+B_1$ corresponding to a signal voltage $U_{S2}<U_S<U_{S4}$ will be recognized as carry-over of the time-pulse plane controlling the preceding data location (actual data). An inductance $B>B_3$, corresponding to $U_S>U_{S6}$, will be recognized as a first data location I1 on the key body, said data location releasing the resetting signal for the receiving circuit. The areas of tolerance or the hysteresis ranges for log. 0 and for log. 1 are shown shaded in FIG. 8.

FIG. 9 shows circuitry for converting the signal voltage $U_S$ into digital voltage levels. A noise filter, consisting of resistor R10 and capacitor C1 is arranged at the input of the circuit. The signal voltage $U_S$ is supplied to the inverting input of an operational amplifier OP1, with a reference voltage +U ref 3 being applied to the non-inverting input. U ref 3 is selected as equalling $U_{S6}$ (see FIG. 8), so that with $U_S>U_{S6}=$U ref 3, at the output of the operational amplifier OP1, the resetting signal U3-N will obtain according to the diagram of FIG. 10a.

The signal voltage $U_S$ continues to be supplied in parallel via the resistor R12, R15 to the inverting inputs of two operational amplifiers OP2, OP3, with reference voltages +U ref 2 and, respectively, +U ref 1 being applied to the non-inverting inputs of said operational amplifiers via resistors R11, R14. Simultaneously, the outputs of the operational amplifiers OP2, OP3 are connected to the appurtenant non-inverting inputs through resistors R 13 and, respectively, R16. This method of positive feedback resistance will afford the operational amplifiers switching characteristics with the hysteresis range described with the aid of FIG. 8. An inverting gate 19 is arranged subsequent to operational amplifier OP2. The course of the output voltage U2-P for operational amplifier OP2, in dependence upon signal voltage $U_S$, is shown in FIG. 10b and the course of the output voltage U1-P for operational amplifier OP3, in dependence upon signal voltage $U_S$ is shown in FIG. 10c. A positive output voltage after gate G19 of operational amplifier OP2 may, herein, signify the presence of a code number log. 1, a positive output voltage of operational amplifier OP3 will then signify the presence of a code number log. 0. FIG. 11 shows a receiving circuit for comparing the actual data as read by the key body with the predetermined set data.

At its input, the circuit will receive the output signals of the circuit as per FIG. 9. The actual data supplied through the NAND gates G14, G15 are in interim storage in the flip-flop G17/G18, and subsequently read-in serially into two four-stage sliding registers 1 and 2 for thus eight dual key data, and then compared in parallel via eight EXOR gates G1 to G8 with the set data as supplied via switches S1 to S8.

For this purpose, the actual data are supplied to the first inputs of the EXOR gates, whilst the data as set are applied to the respective second inputs. For this purpose, the second inputs will herein be connected via resistors R1 to R8 to the supply voltage, so that with the switches S1 to S8 open, they will be at level log. 1 and may be brought to the reference potential, and thus to log. 0, by closing the switches S1 to S8. Should the comparison set data/actual data result in matching, the common output line of all EXOR gates G1 to G8 will be on level log. 1, so that the AND gate G9 which is supplied this signal will supply at its output the information log. 1 with the significance "matching" or "correct", since the second input of the AND gate G9 will obtain log. 1 from the AND gate G12, as at this moment, log. 1 is applied to both of its inputs. For this purpose, one input of G12 is supplied with the voltage U3-N (compare FIG. 10a), the other input of G12 being connected to the output A8 of the sliding register 2 which supplies log. 1 via a delaying line VZ1. The output signal of the AND member is simultaneously being supplied to the timing-pulse input of a J/K flip-flop FF1 which will thus store the respective latch position and the output signal of which will set the mechanical latching arrangement of the lock either to "latching" or "unlatching". Should however, due to no matching of the actual data as read out, with the data as set, the signal log. 0 prevail in the common output line of the EXOR gates G1-G8, the AND member G9 will remain blocked, but a gate G10, otherwise arranged in parallel to the AND gate 9, will be switched to transmittivity via an inverting gate G11, so that at the output of gate G10 there will appear the signal log. 1 with the significance "no matching" or "wrong" which, in given instances, may be used for the actuation of alarm sequences. The output signal of the delaying line VZ1 is, furthermore, supplied via an inverting gate G13 to the respective first inputs of two NAND members G14, G15, with the voltages U2-P (comp. FIG. 10b), or, respectively U1-P (comp. FIG. 10c) being applied to their respective second inputs, whilst their outputs are connected to the inputs of flip-flop G17/G18. In order to obtain the timing pulses, the outputs of the NAND members G14, G15 are simultaneously connected to the inputs of an AND member G16, the output of which is connected to the timing-pulse inputs of the sliding registers 1 and 2. The two resetting inputs of the sliding registers obtain the signal U3-N (comp. FIG. 10a).

FIG. 12 shows in diagram form the signal voltage $U_S$ generated upon inserting or withdrawing of the key body, and also the appurtenant characteristic of the voltages in circuits as per FIGS. 9 and 11, as shown in the respective diagram lines. The diagrams will, furthermore, be explained as follows: on introducing the key into the reading head, data location I1 will form a resetting signal U3=log. 0. This will set the sliding registers 1,2 at their outputs A1 to A8 to log. 0 and the flip-flops G17, G18, via NAND gate G15, to log. 1. The interface signals, i.e. the output signals of AND gates G9, G10 are kept to zero by the output A8=log. 0 of sliding register 2 as well as via G12. Upon the key body being inserted further, the first timing-pulse level T1 will reduce the magnetic inductance B through the Hall generator to zero. The output of G1 will thereby become log. 1, and thus also the output of G16. The rising signal flank represents the first time-pulse for the sliding register, so that the actual data applied to the serial data input of the sliding register 1 will be relocated to output A1. The inductance caused by the succeeding data location I2 will remain below the reset level B3. The next actual-data input will ensue upon reaching the succeeding time-pulse level T2, so that one respective log. 1 is stored at each output A1 and A2 of sliding register 1. As per FIG. 12, the next data location will be at log. 0. It will cause generation of the signal U1-P=log. 1 since it will, via G14 effect a changeover in the flip-flop G17, G18 in such a manner that the signal log. 0 will obtain at the output of the latter. The succeeding time-pulse lever T3 will generate a further sliding pulse, so that now the state A1=log. 0, A2=log. 1, A3=log. 1 prevails in the sliding register 1. The following data location I4 is stored in an analogous manner in sliding register 1. For serial data transfer from sliding register 1 to sliding register 2, a connection is effected between the parallel output A4 of sliding register 1 with the serial data input of sliding register 2. After input of the last actual data into the sliding register memory, the initially put-in actual data (log. 1) will be at output A8 of sliding memory 2 and will, via the delay member VZ 1 which serves to compensate the running time of EXOR gates G1 to G8 and via AND member G12, unblock the AND gates G9, G10 for effecting the decision correct/wrong. Simultaneously, the output signal of VZ1 is inverted via G13 into a blocking signal for the NAND members G14, G15 to prevent, respectively, further information input or a change in the contents of the sliding registers. The interface signals (output signals of G9 and G10) will thus remain unaffected also when withdrawing the key body, until upon reaching data location I1, the sliding registers 1 and 2 are reset by the voltage U3-N, i.e. their outputs A1 to A8 being set to log. 0 and the interface signals being brought thereby to log. 0. The logical circuit between the output signal of VZ1 and the resetting signal U3-N, effected via the AND gate G12, will prevent the occurrence of undesirable pulse peaks at the output of G9 and G10 during resetting. The fact that output A1 of sliding register 1 will be set to Log. 1 if the key is being withdrawn at the moment of resetting the sliding registers, is of no consequence, since a resetting sequence will ensue anew upon the key being inserted again. The first data location I1 is thus provided for the resetting sequence and will not be available for individual encoding.

FIG. 13 depicts a reading head with key in an embodiment similar to FIG. 1. The loop-like closed yoke consists of flux-conducting sections 131a, 131b and 131c. The cross-sectional areas of the flux-conducting sections 131a and 131b are decreasing in the direction towards the Hall generator in order to increase the inductance in the Hall generator. Two permanent magnets 133 and 134 are arranged in mutual symmetry with their poles of identical polarity oriented toward each other. Sensing brackets 137a, 137b and 137c, located upon respective flux-conducting sections and oriented inward, serve for concentrating the magnetic flux onto the coded segments. The key body 12 of magnetically nonconductive material is provided at data locations I1 to In and timing-pulse planes T1 and Tn with perforations of uniform size. As is the case in FIG. 1, distance a from the first data location to the first timing-pulse plane will be greater than the corresponding succeeding distances b. The perforations in the key body 12 serve to accommodate carriers 138 of magnetically non-conductive material. Each carrier 138 is provided with a coded segment 135a, 135b or 135 consisting of magnetically conductive material. The coded segments 135a, 135b are, as a matter of principle, of identical shape. The coded segment 135a, however, is located on the upper half of the carrier 138 and will, by its position, identify, for instance, the code number log. 1; the coded segment 135b will, contrary to this, always be located on the lower half of the coded segment 138 and identify the code number log. 0 The coded segments 136 will identify the timing-pulse planes.

In its individual positions, the key body will cooperate with the reading head as shown in FIGS. 14a, 14b, 14c, wherein however, for simplicity's sake, only the respective coded segments are shown, with key body and carriers omitted. Analogous to FIGS. 2 to 5, the coded segments 135a and 135b will effect shunts that are assymetrical relative to Hall generator H and will cause inductance through the Hall generator, with the direction of inductance determining the respective code number. The coded segments 136 for the timing-pulse planes will, however, produce two symmetrical magnetic shunts so that no inductance will obtain in the Hall generator.

A further embodiment of the reading head and appurtenant key is represented in FIG. 15. The Hall generator is, therein, located within an air gap between two flux-conducting sections 151a, 151b arranged symmetrical to it and provided with respective sensing brackets 157a, 157b. At a distance thereto, approximately corresponding to the width (thickness) of key body 12, there is arranged a further, U-shaped, flux-conducting section 151c, again with thin sensing brackets 157d, 157e located on its face sides. A magnet 153 is provided in the center of a further flux-conducting section 151c, the magnetic axis of the former being oriented toward the Hall generator located opposite. To increase the flux concentration, a sensing bracket 157c, oriented toward the air gap, is arranged on the magnet 153. The key body corresponds to a great degree to that per FIG. 13. The increase for data locations and timing-pulse planes are intended for accommodating carriers 158. Each of these carriers 158, intended for the data locations, is made of nonmagnetic material and carries two coded segments i.e. for instance two coded segments 155a for identification of a code number log. 1, two coded segments 155b for identification of a code number log. 0, wherein these coded segments may, in principle, be alike and will define the respective code number by their position on the respective carrier. The carriers 158, arranged for the timing-planes are, however, provided with coded segments 155a as well as coded segments 155b.

FIGS. 16a, 16b and 16c depict the magnetix flux resulting from the respective positions of the coded segments i.e. FIG. 16a for the case of a code number log. 0, FIG. 16b for a timing-pulse plane and FIG. 16c for the case of a code number log. 1, As shown, particularly by a comparison with FIGS. 14a to 14c, the embodiment as per FIGS. 15, 16 is of the advantage that only one magnet is required and that there will be only slightly higher expenditure for the coded segments the difference from the embodiment per FIG. 13 being in the first line that the coded segments will not cause magnetic shunts in the yoke of the reading head but will close the magnetic circuit between the two halves of the yoke. Here, too, the respective code number is identified by the magnetic flux through the Hall generator H running once in one, and then in the opposite direction, whilst the timing-pulse planes will not effect any inductance in the Hall generator since their appurtenant coded segments 155a and 155b are in symmetrical arrangement.

While in the embodiments described hitherto, the respective code number was identified by the direction of the magnetic flux through the Hall generator, and the timing-pulse planes were represented therein by the respective coded segments, determination of the code number in the embodiments described below will be effected by the magnitude of inductance in, or, respectively, through, the Hall generator, with the timing-pulse planes no longer requiring their separate coded segments in the key body and being characterized only by the inductance through the Hall generator dropping to a value close to 0.

A first embodiment of this type is shown in FIG. 17. The reading head comprises a loop-like enclosed yoke of a width approximately equal to the mutual distance of data locations I1 to In and provided with a cutout for inserting the key body 12 of nonmagnetic material. The Hall generator H is arranged at the center of one side of the cutout on a sensing bracket 172 connecting it with the adjacent leg of the yoke, the magnet-sensitive surface of the Hall generator being arranged parallel to the direction of displacement of key body 12. The magnet-sensitive surface of the Hall generator is identified by HF. Opposite to the Hall generator, there is arranged a magnet 183 (compare FIG. 18), with its magnetic axis oriented toward the Hall generator, and with only a flux-conducting section 179 of said magnet being identifiable in FIG. 17, said section serving for flux concentration. The data locations I1 to In are arranged in succession on the key body 12 at distances b. The key body 12 is provided with cutouts for accommodating carriers 178 of magnetically nonconductive material. A coded segment 175a or 175b is superimposed on each carrier 178. The coded segment 175a is provided at both sides with a face side of small cross-sectional area and will thereby produce high inductance in the Hall generator, this inductance corresponding, for example, to a code number log. 1. The coded segment 175b will, at least at its end facing the Hall generator, be provided with a face side of large cross-sectional area, and it may, as per FIG. 17a, also be provided at both its ends with a face side of large cross-sectional area. The large cross-sectional area of the face side will result in a correspondingly lower induction in the Hall generator, thereby defining the code number log. 0. Drain brackets 177a, 177b are arranged at a distance b/2 from it, at both sides of the Hall generator surface HF, their function to be explained later on.

FIG. 18 shows a cross cut through the yoke with the also partially cut key inserted. It can be recognized that the magnetic flux is closed from magnet 183, via its flux-conducting section 179, the oppositely located coded segment 174a, the Hall generator surface HF, the subsequently arranged sensing bracket 171 and the yoke.

In FIG. 19, the key body 12 has been further inserted by a half step, i.e. the distance b/2. The coded segment 174a and the coded segment 175b of the succeeding data location are now located symmetrical to the Hall generator and its magnet-sensitive surface HF.

In this position, the inductance in the Hall generator will be practically equal to 0, since the magnetically nonconductive key body 12 will be located between its magnet-sensitive surface HF and the flux-conducting section 179, while the stray flux of magnet 183 is being drained via coded segments 175a, 175b, and the drain brackets 177a and 177b arranged opposite to said coded segments. In principle, the drain brackets 177a, 177b would not be required, they are, however, of the advantage to allow operation at smaller distances b between the data locations. The drain brackets may be made with enough to extend to the sensing bracket.

A further decrease in the distance of the data locations is possible with the embodiment as per FIG. 20, showing the same reading head as FIGS. 18 and 19 but with their drain brackets 177a and 177b being additionally provided with small compensating magnets 206a, 206b which will fully compensate the stray flux of magnet 183 which will, in the position of the coded segments 175a, 175b as shown, still pass through the Hall generator.

FIG. 21a shows a top view upon the magnet yoke 171 per FIG. 17. The coded segment 175a will concentrate practically the entire magnetic flux of magnet 183 onto the magnet-sensitive surface of Hall generator H.

FIG. 21b shows the yoke in the same view but with coded segment 175 of FIG. 17a between magnet and Hall generator. As indicated, the magnet-sensitive surface HF is being intersected by only a small portion of the flux exiting from the face side of coded segment 175, so that an inductance in the Hall generator will obtain that is considerably lower relative to the case of FIG. 21a.

FIG. 22 shows for this instance of modulation of the Hall generator, the dependence of the signal voltage $U_S$ supplied by it, upon the inductance B. The diagram corresponds to a high degree to the diagram of FIG. 8, the difference being only that the Hall generator will now be driven beginning with the inductance B=0.

FIG. 23 shows the circuit for obtaining logical signal levels from the signal voltage $U_S$. This circuit is only slightly different from the corresponding circuit as per FIG. 9. The signal levels at the output of operational amplifiers OP1 to OP3 are shown in FIGS. 24a, 24b and 24c which, again, correspond to a great degree to the FIGS. 10a to 10c. Since the time-pulse signal UT is being formed only at inductance values lower than the range determined for the code number log. 0, there will be, different from the circuit per FIG. 9, only one hysteresis range be required herein, so that in FIG. 23 it is only the operational amplifier OP3 which is provided with a positive feedback resistance from its output to its noninverting input.

Figure 11:
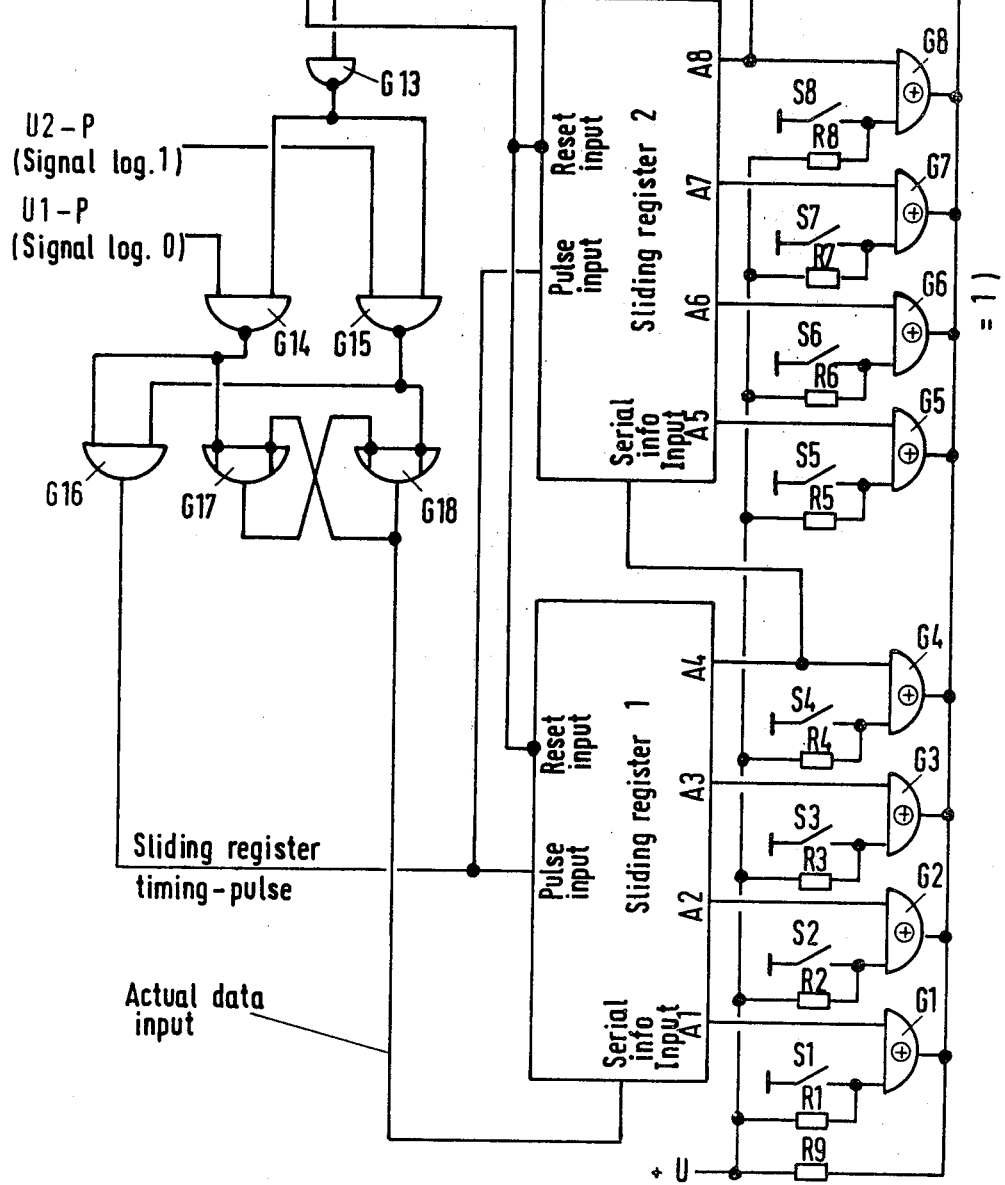
Figure 12:
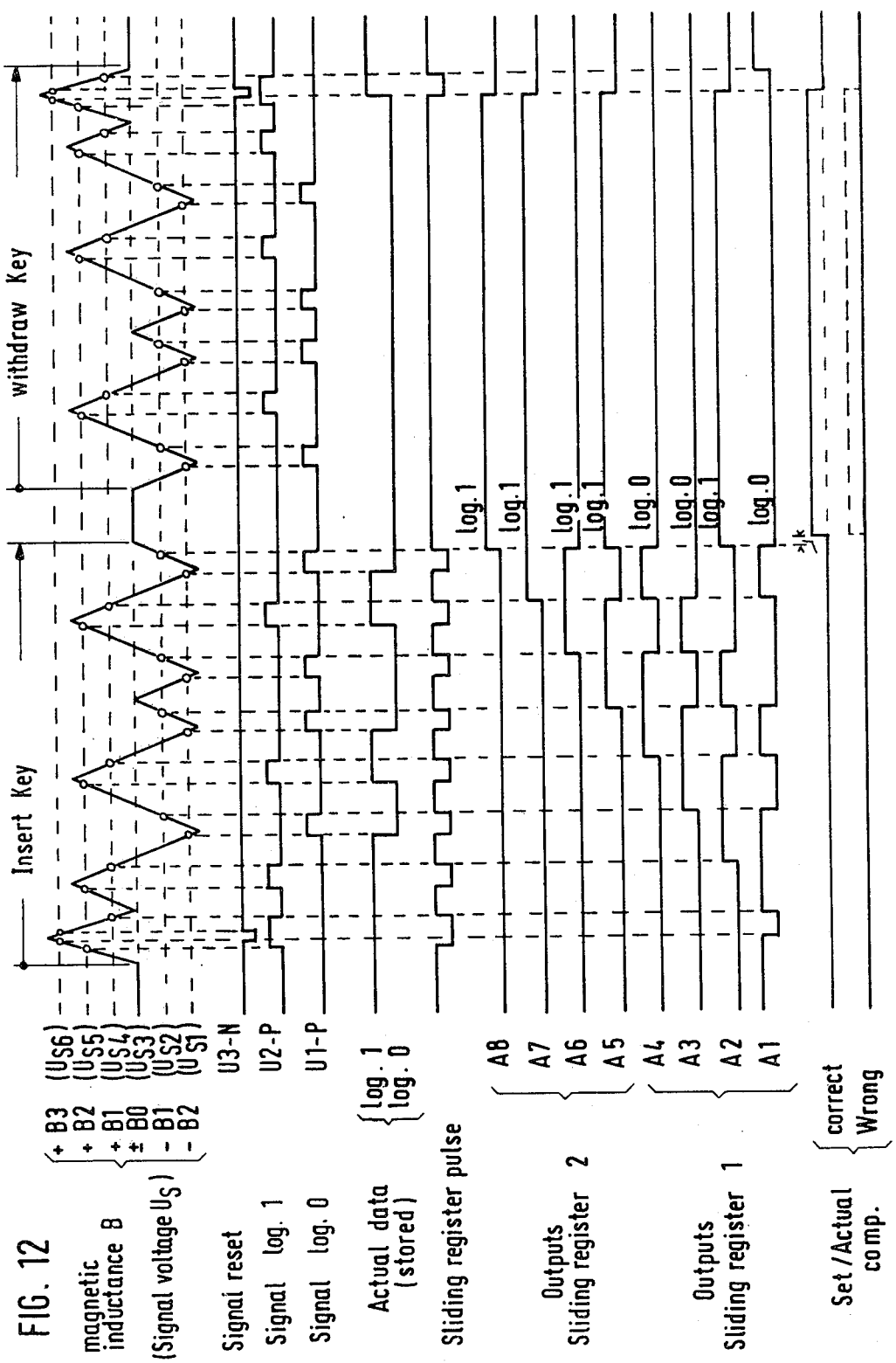

The digital voltage supplied by the operational amplifiers OP1 to OP3 may be processed in the circuit per FIG. 11, but according to the modification shown in FIG. 25. Obtaining of the required signal levels is, however, familiar to the expert.

Figure 26:
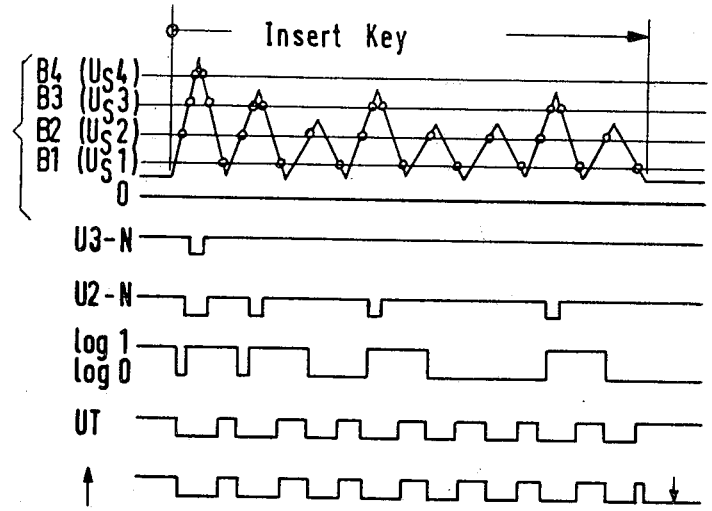

The diagram in FIG. 26 shows the characteristic of the corresponding voltages upon insertion of the key body into the reading head.

It has so far been assumed herein, that each data location is encoded in a dual code, i.e. that it can assume only the states, or, respectively, code numbers, log. 0 and log. 1. It is particularly the direct determination of the magnitude of induction in the Hall generator by requisite dimensioning of the cross-sectional area of the face sides of the coded segments in the embodiment per FIG. 17, that will allow operation also with a code of higher valence. FIG. 27 shows the dependence of signal voltage $U_S$ upon inductance B in the Hall generator in the case of a quadrivalent code used for encoding, wherein each data location may assume four data levels IN1 to IN4. With n data locations on the key body, the number of different data for the key, i.e. the degree of encodability, will be increased by the factor $2^n$.

Figure 28:
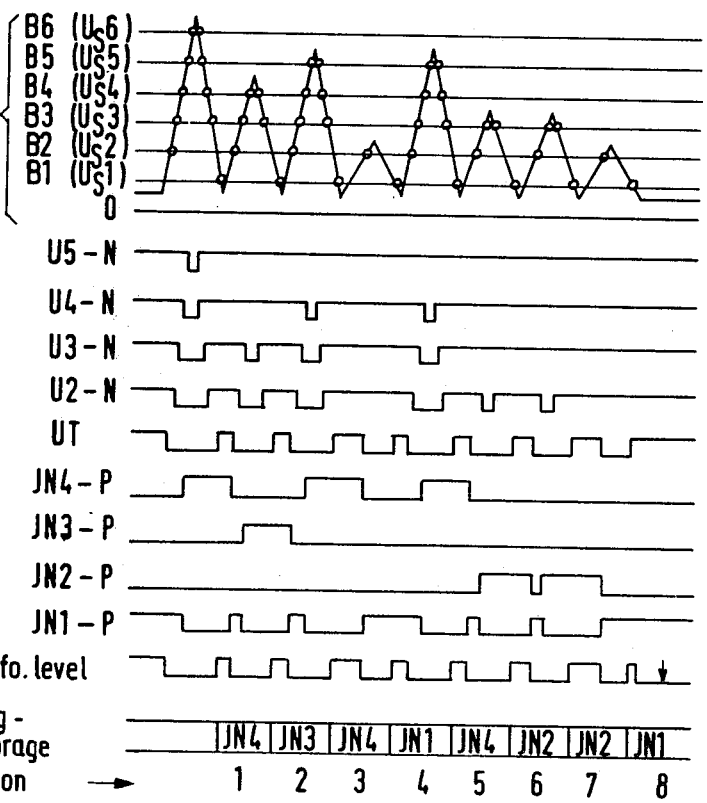

FIG. 28 shows in a diagram the characteristics of the respective voltages at the output of the Hall generator module (FIG. 7) and also in the receiving circuit.

Figure 29:
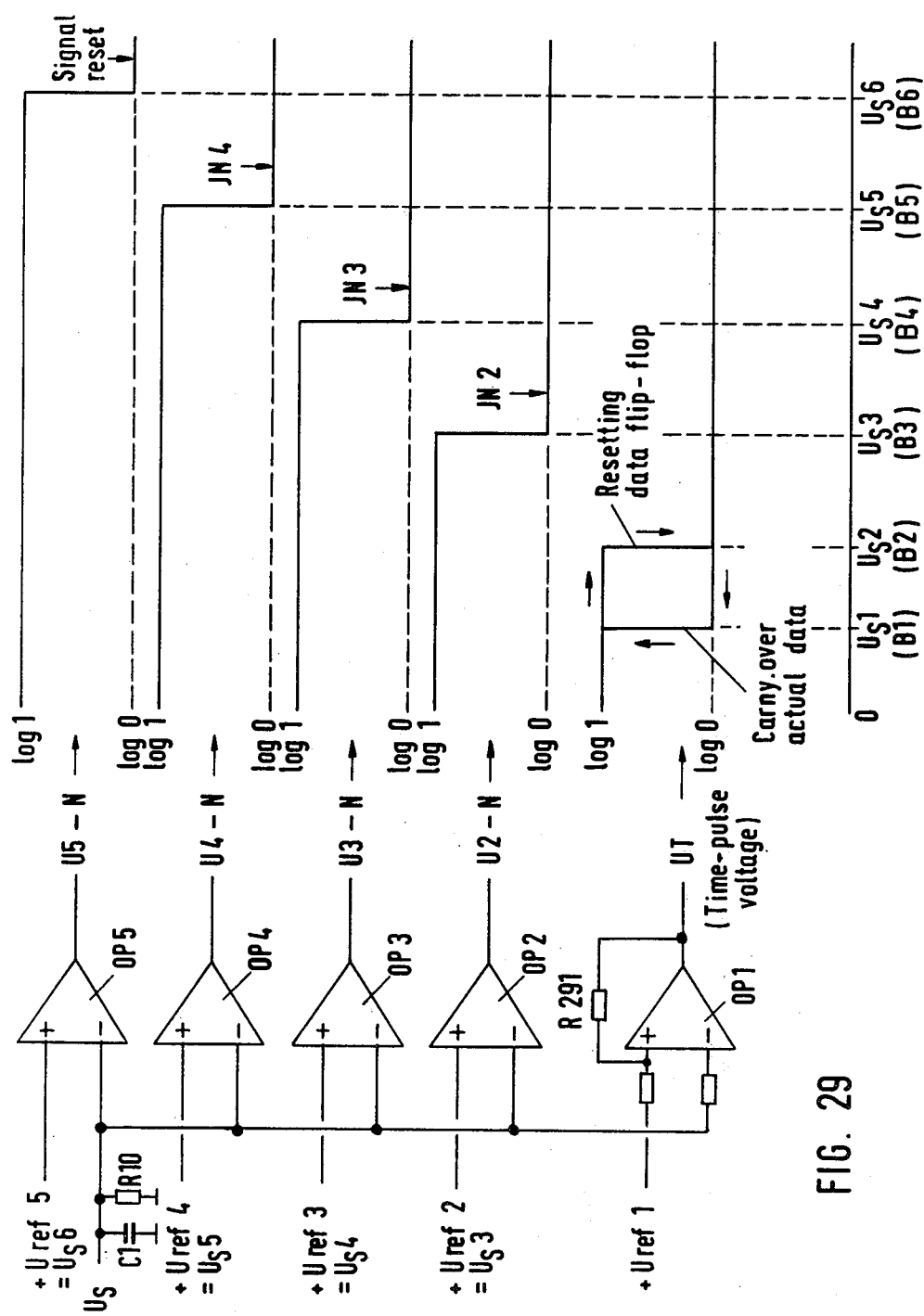

FIG. 29 shows the circuitry for generating digital voltage levels from the analog signal voltage $V_S$, comprising in essence the operational amplifiers OP1 to OP5. As is the case in FIG. 23, only the operational amplifier OP1, supplying the timing-pulse voltage UT for carrying over of the respective actual data (key data), is wired to a positive feedback resistance for obtaining a hysteresis zone. The signal diagrams arranged next to the respective operational amplifiers illustrate the evaluation of the signal voltage $U_S$ for obtaining the different data levels in digital form.

Figure 30:
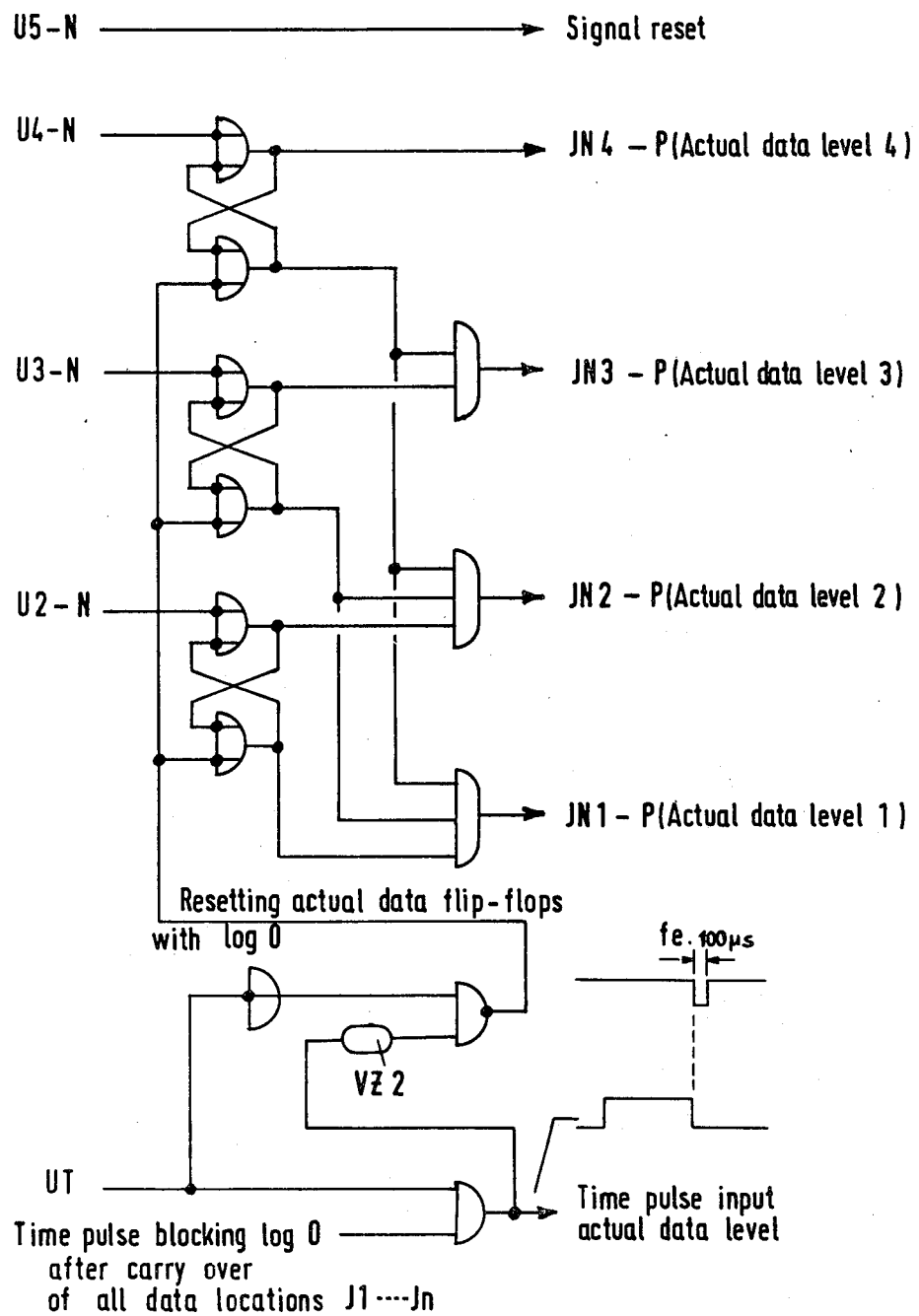

The output voltages supplied by the operational amplifiers OP1 to OP5 may be processed for the subsequent comparison of actual data/set data in a logic circuit as per FIG. 30, comprising in essence flip-flops for intermediate storage and also AND gates. Such circuits are also familiar to the expert.

Figure 17:
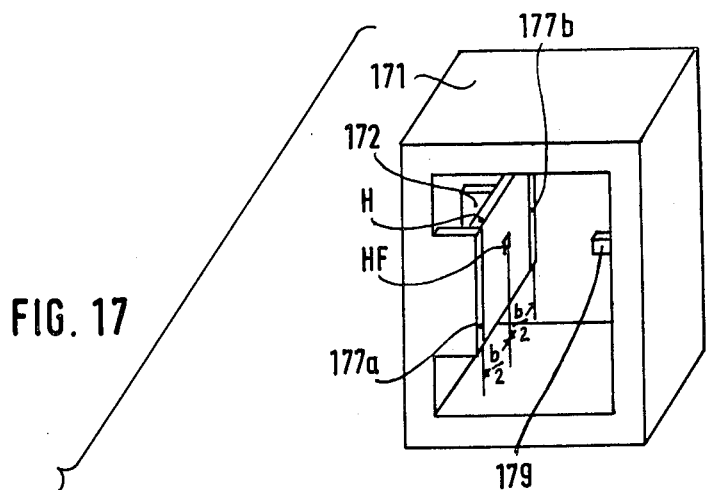
Figure 17A:
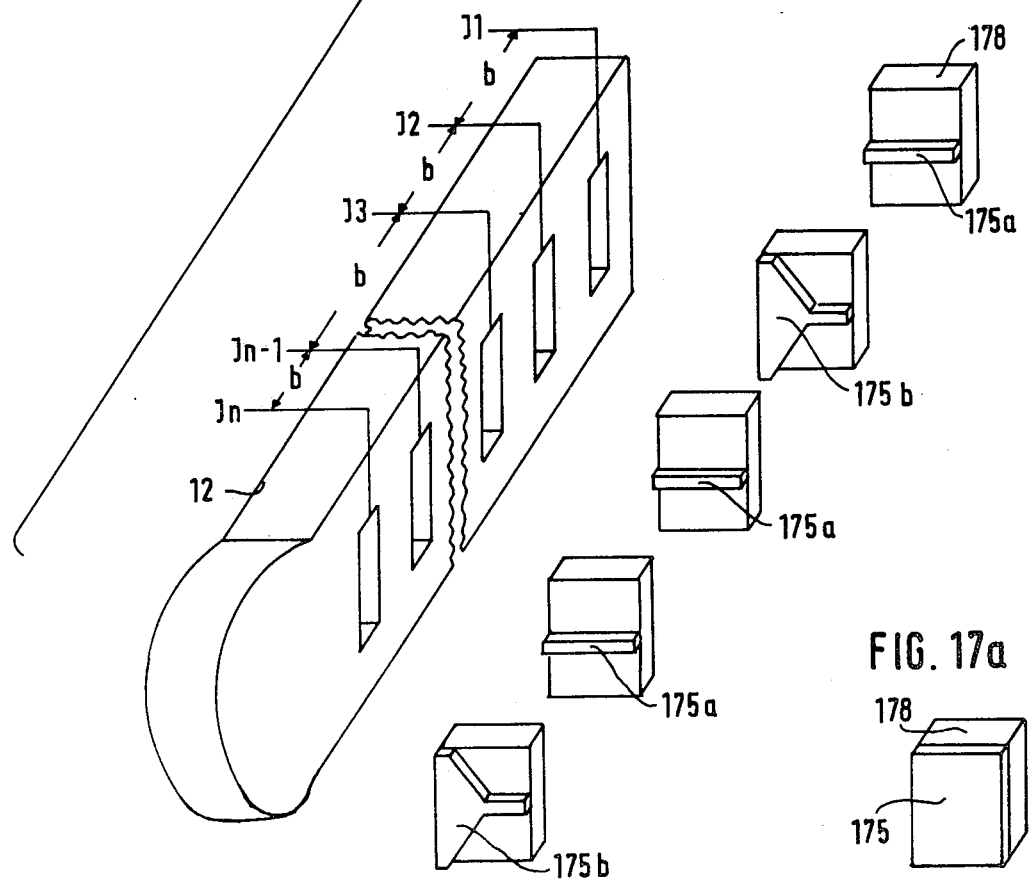

The key body 12 with rectangular cross section, as shown in FIG. 17, may be provided at its upper and its lower narrow sides with notches for the simultaneous actuation of mechanical tumblers in a lock of conventional construction. Should, however, such a mechanical coding of the key body is effected at its wide sides, for instance in the form of recesses, it will also be possible to arrange the data locations at both narrow sides. A corresponding embodiment is shown in FIG. 31. A cross-section through this key body along the line I—I in FIG. 31 is shown in FIG. 32a. A further section through this key body, along the line II—II of FIG. 31, is shown in FIG. 32b.

In order to keep the stray flux at a low level, the magnetic flux through the key body 12 of nonmagnetic material is, in this embodiment, transmitted through a thin rod 320 of magnetically conductive material. The rod 320 terminates at both narrow sides of the key body in one respective carrier disk 321. On this carrier disk, provision is made for a strip-like coded segment 325b (FIG. 32a) for encoding of log. 0, or for a small square-shaped coded segment 325a (FIG. 32b) for encoding of log. 1. A further embodiment of this type of key body is shown in FIG. 33a in a cut and in FIG. 33b in top view. In order to generate the code number log. 0, the rod 320 is provided herein at both ends with contacts of magnetically conductive material 335b. Only rod 320 is required for encoding the code number log. 1. In the embodiments from FIG. 31 on, the data locations at both opposite narrow sides of the key are in complete mutual symmetry. In this way, a reversible key is obtained which may be inserted into the reading head either in its position as shown or also in a position rotated by 180° about its longitudinal axis.

Such a reading head is shown in simplified representation in FIGS. 34a, 34b. In principle, this is the same reading head as in FIG. 17, consisting of a yoke 341 which carries on its one leg the Hall generator H and on the opposite leg a magnet 343. As in the embodiment per FIG. 17, provision is made herein for a flux-conducting section for the magnet 343, a sensing bracket for the Hall generator H and also for drain brackets at both sides of the Hall generator, the foregoing, however, not being identified or, respectively, not being recognizable in this view. In the instance of a code number log. 1, practically the entire magnetic flux of magnet 343 will run through a coded segment 345a wich may correspond to the rod 320, and through the Hall generator H (FIG. 34a). In the instance of a code number log. 0, however, it will only be a portion of the magnetic flux that will run through the hall generator H, since the corresponding coded segment 345b, which in its details may be constructed as per FIG. 33a, will have a larger cross-sectional face area and will thus generate a correspondingly lower inductance in the Hall generator H.

FIG. 35 shows a further embodiment of the reading head and the key body. The reading head consists of an approximately U-shaped yoke 351 of a width b approximately equal to the mutual distance of the data locations I1 to I6 on the key body 12, one of the legs of said yoke being provided with a magnet 353 with a magnetic axis oriented at right angle to the plane of the lateral leg. A sensing bracket 352 is located at the center of the other leg of said yoke 351 and carries the Hall generator H with the latter's magnet-sensitive surface HF arranged parallel to the direction of displacement of key body 12. Drain brackets 357a, 357b, with compensating magnets 356a, 356b, are again arranged at both sides of sensing bracket 352. Each data location is formed by a slot-shaped recess which can accommodate an approximately U-shaped, magnetically conductive coded segment 355a or 355b. The coded segments 355a will, due to the small cross-sectional area of their short face side ending above the magnet-sensitive surface HF of the Hall generator H, produce a high inductance which may, for instance, signify the code number log. 1. The coded segments 355b will, however, due to the large cross-sectional area of their leg facing the Hall generator, produce a low inductance which will then signify the code number log. 0.

FIG. 36a shows a cut through the key body 12 at a data location generating the code number log. 0.

FIG. 36b shows a cut through the key body 12 at a data location generating the code number log. 1.

FIG. 36c shows a similar cut as FIG. 36a, however with the respective coded segment 365b for a code number log. 0 arranged in unfolded symmetry. The coded segment for a code number log. 1 may be constructed in unfolded symmetry in the same manner. A reversible key will thus be obtained.

It is also possible to use strip-shaped coded segments instead of the approximately U-shaped coded segments. This embodiment is shown in FIGS. 37a to 37c. The reading head will, therein, in essence correspond to the one shown in FIG. 35, but the Hall generator will no longer be arranged with its magnet-sensitive surface at the center of its sensing bracket—not visible in this view—but offset in the direction of magnet 353, as indicated by the dot-dash line. A coded segment 375a for the generation of a code number log. 1 is represented in FIG. 37a. FIG. 37b shows a coded segment 375b for the generation of a code number log. 0. It will be seen that arrangement of the Hall generator out of center will result in the instance of FIG. 37a, in practically the entire magnetic flux running through the magnet-sensitive surface of the Hall generator, whilst in the instance of FIG. 37b, a considerable portion of the magnetic flux will will run past the Hall generator and over the free zone of its sensing bracket.

FIG. 37c shows an embodiment with two coded segments 375a arranged in unfolded symmetry within key body 12, whereby a reversible key is obtained.

FIG. 38 shows a modification of the embodiment of reading head and key body as per FIG. 35. The reading head comprises an approximately U-shaped yoke 381, of a width approximately equal to the mutual distance of data locations I1 to I8 on the key body 12 which is of nonmagnetic material. Each leg of the yoke 381 carries a respective magnet 383 and 384. In the center of the lateral leg of the yoke, there is located on a sensing bracket 382 the Hall generator H with its magnet-sensitive surface HF parallel to the direction of displacement of the key body. Drain brackets 387a, 387b are arranged at both sides of the sensing bracket 382. The two magnets 383 and 384 are of opposite polarity, with one respective flux-conducting member 389a and 389b arranged on their upper sides. Each data location of this embodiment consists of two coded segments 385a, 385b of different lengths, with the interstice 380 arranged between these. (FIG. 39).

FIG. 40a depicts a view of the reading head with the key body 12 cut in the zone of a data location, f.i. data location I1. It can be seen that the coded segment 385a will close the magnetic flux of magnet 384 in the indicated direction over the magnet-sensitive surface of the Hall generator, while the coded segment 385b will close the magnetic flux of magnet 383 over the portion of the sensing head of the Hall generator adjacent to the magnet-sensitive surface of said generator. The two magnetic fluxes are of opposite direction. The code number log. 1 may be allotted to the indicated direction of the magnetic flux through the magnet-sensitive surface of the Hall generator.

The code number log. 0 is then obtained as shown in FIG. 40b, by exchanging the coded segments 385a and 385b. The magnetic flux of magnet 383 through the Hall generator is then closed, but in the direction opposite to that in the instance of FIG. 40a. The magnetic flux of magnet 384 is, however, closed through the coded segment 385b and essentially over the free portion of the sensing bracket. In this embodiment, the code numbers are discriminated according to the direction of the magnetic flux through the Hall generator, so that signal evaluation may ensue by means of the circuit per FIGS. 9 and 11.

FIG. 41 shows a top view onto the reading head, wherein the coded segments of consecutive data locations of the key body, not shown herein, are located in such a position, i.e. coinciding with drain brackets 387a, 387b (FIG. 38) not shown in the top view, wherein, respectively, the timing-pulse plane is being defined or the timing pulse generated.

FIG. 42 demonstrates that an approximately U-shaped construction of the coded segement 425a will allow an even stronger concentration of the flux onto the magnet-sensitive surface HF of the Hall generator, and thus a corresponding increase of the inductance in the Hall generator.

FIG. 43 demonstrates that an arrangement of the coded segments in unfolded symmetry for obtaining a reversible key will also be possible in the aforenoted embodiment.

In all embodiments described hitherto, the coded segments in the key consist of coded segments of soft-magnetic material. The data locations may, in principle, consist in all embodiments of small permanent magnets magnetized zones in the key body. The corresponding (main) magnet(s) in the reading head may then be dispensed with.

Figure 44:
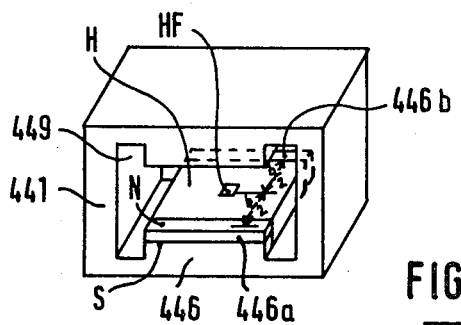

FIG. 44 shows an embodiment of this type wherein the reading head consists of a loop-like closed yoke 441, of a width, in the direction of displacement of the key body, approximately equal to the mutual distance of the data locations, and provided with a central cutout for insertion of the key. In the center of one side of this cutout, there is located the Hall generator H upon a sensing bracket connecting said generator with the adjacent leg of the yoke and covered by the generator, the magnet-sensitive surface of the Hall generator being, herein, arranged parallel to the direction of displacement of the key body. A flux-conducting section 449 is arranged at the opposite side of the cutout. The key body comprises a flat magnet 44, with flux-conducting members 445a, 445b set on both sides of said magnet at data locations I1 to I5. As in the previous embodiments, the cross-sectional area of the face sides at the flux-conducting members will determine the magnitude of inductance in the Hall generator and thus define the respective code number. In principle, it will suffice that an adequate dimension is provided for the cross-sectional area of the face side in the flux-conducting section located, in the respective instance, opposite the Hall generator.

A symmetrical embodiment is, however, preferable, since a reversible key is then obtained. Instead of an integral magnet 443 it is also possible to use magnetizable material which is permanently magnetized only in the zones of the data locations. The key body consisting of magnet 443 and flux-conducting sections 445a and 445b with different cross-sectional face-side areas, may be imbedded in nonmagnetic material (not shown) in order to obtain smooth surfaces. The mode of flux control for obtaining of, respectively, a code number log. 0 or log. 1, can be seen from the cuts shown in FIGS. 45a and, respectively, 45b. In order to obtain moderate distances between the data locations, drain brackets 446 with compensating magnets 446a, 446b are arranged at distances b/2 at both sides of the magnet-sensitive surface HF, as shown in FIG. 44.

Figure 46:
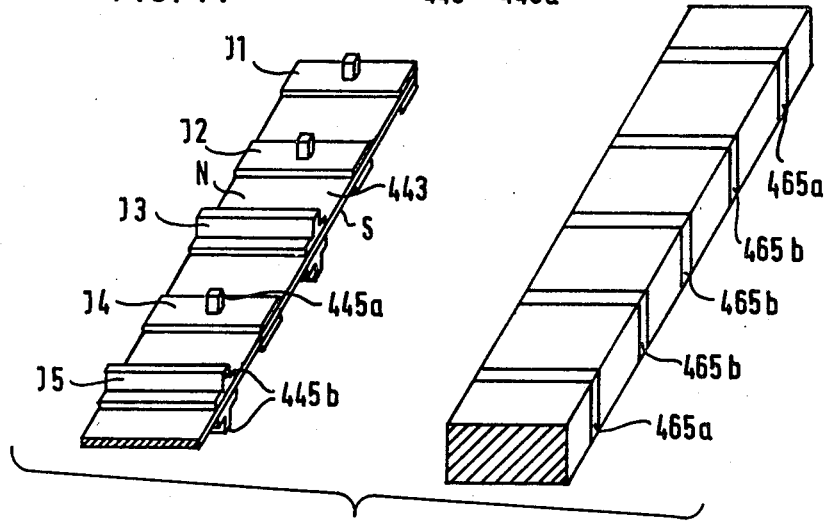

FIG. 46 shows a modification of the key body usable for the reading head as per FIG. 44. It consists herein of a magnetizable material, magnetized in the zone of the data locations to a higher or lower degree according the the respective code number, so that the coded segments 465a and 465b will result thereby.

Figure 7:
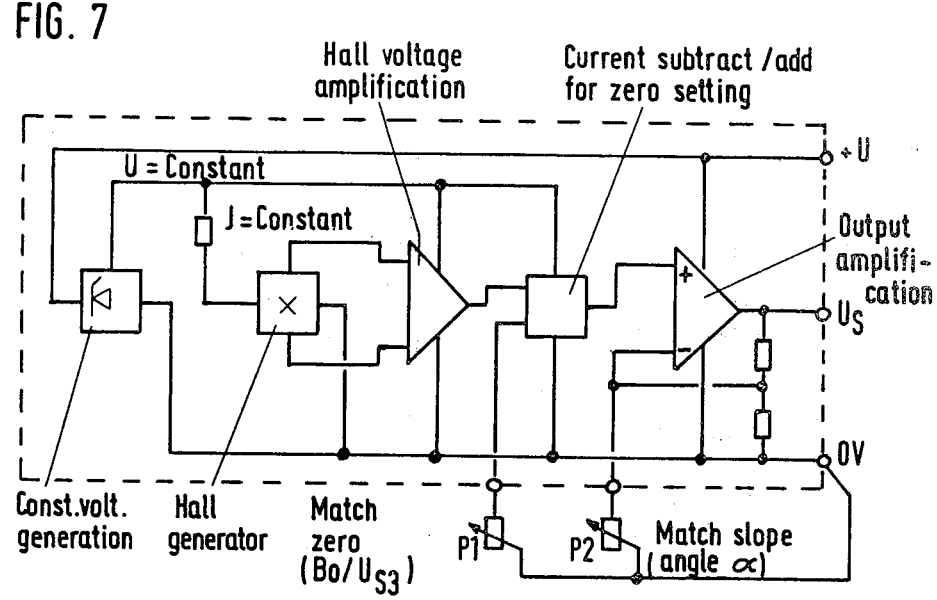
Figure 8:
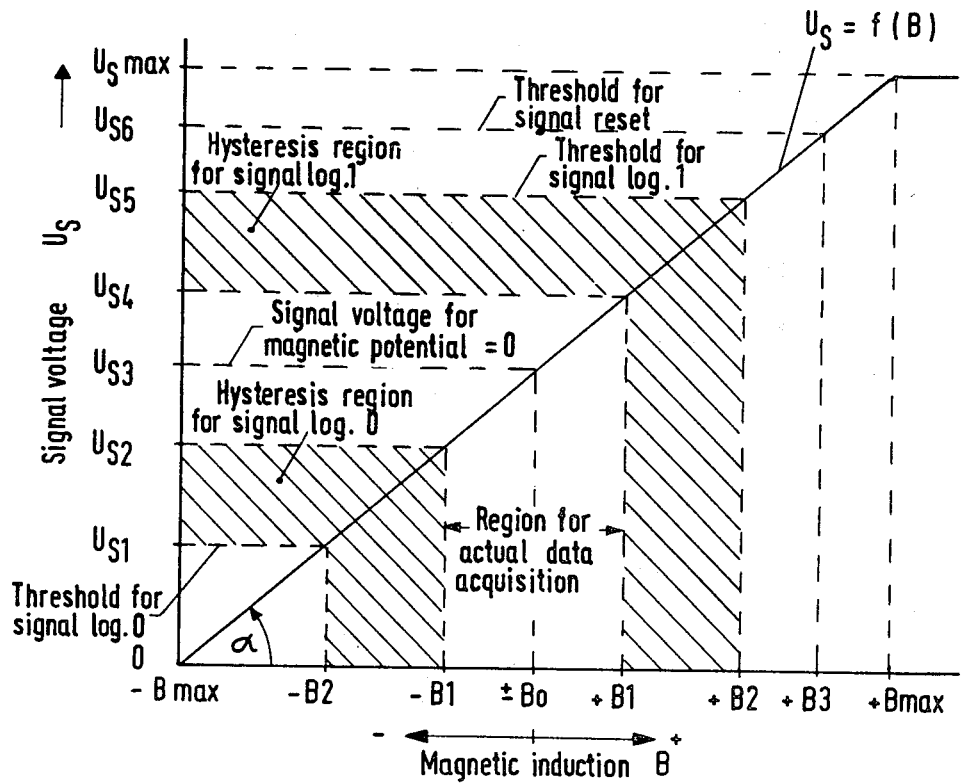
Figure 45A:
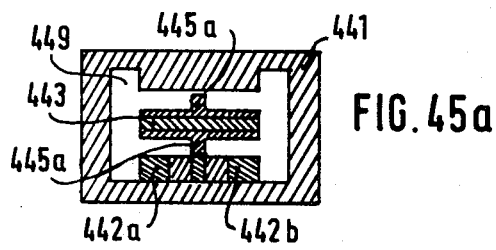
Figure 45B:
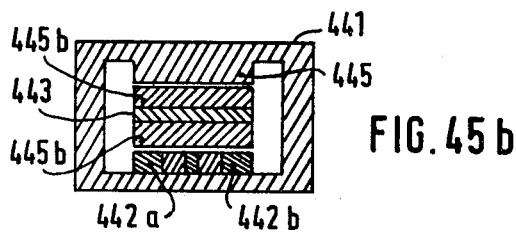
Figure 47:
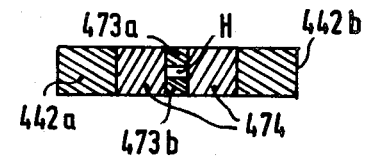

FIG. 47 shows in a cut and enlarged scale an embodiment of the zone of the reading head containing the Hall generator of a construction as already indicated in FIGS. 45a, 45b. Whilst it was assumed hitherto, that the Hall generator, with an extremely small magnet-sensitive area (f.i. 100 $\mu$m $\times$ 100 $\mu$m), will be a component of a plate-shaped Hall generator module according to FIG. 7, consisting for its remainder of nonmagnetic material and being of a thickness that must not be neglected, the Hall generator H of the embodiment per FIGS. 45a, 45b and 47 is embedded, practically with no air gap, between two flux-conducting platelets 473a, 473b which conjointly form the sensing bracket. This sensing bracket is, in turn, imbedded in nonmagnetic material 474 which may, for instance, contain in integrated form the circuits for constant-current supply of the Hall generator and for amplifying of its output signal, as shown in FIG. 7. This arrangement will be located between two drain brackets 442a, 442b of magnetically conductive material and of rod-like shape, oriented parallel to the direction of displacement of the key body. The drain brackets will carry over a portion of the magnetic flux exiting from a coded segment of large cross-sectional face area (f.i. 445b in FIG. 44), so that a correspondingly lower inductance will result through the Hall generator H via the flux-conducting platelets 473a, 473b.

FIG. 48 shows a further embodiment of the reading head and the key body, with only the construction of the latter at the data locations I1 to I6 being shown therein. The reading head consists of an approximately U-shaped yoke 481, of a width equal to the mutual distance of data locations I1 to I6. One leg of the yoke carries the Hall generator H which may also be constructed as per FIG. 47, with its magnet-sensitive surface parallel to the direction of displacement. Drain brackets 487a, 487b with compensating magnets 486a, 486b are again arranged at both sides of the Hall generator. The lateral leg of yoke 481 carries a further drain bracket 488 oriented parallel to the direction of displacement. A flux-conducting section 489 is arranged at the opposite leg of the yoke, opposite to the Hall generator. Each data location I1 to I8 comprises a magnet 483 with flux-conducting sections 485 set at both its sides. Each of the rod-like flux-conducting sections is provided with a small face area 485a co-operating with, respectively, the Hall generator H and the opposite flux-conducting section 489, as well as a lobe oriented at right angle to the axis of the rod-like flux-conducting member, said lobe having a face area 485b which will suitably be larger than the face area 485a.

The cut views of FIGS. 49a and 49b show, that the magnetic flux of magnet 483 will ensue via flux-conducting section 485 and the opposite flux-conducting section 489 through the yoke 481, and will be closed, depending upon the position of face area 485b of the other flux-conducting section, either via the Hall generator, as shown in FIG. 49a, or via the drain bracket 488, as shown in FIG. 49b. High inductance in the Hall generator will result in the first instance, and low inductance in the latter case. The flux-conducting section 485 which, in the respective instance, is facing the Hall generator, will thus form the coded segment which, dependent upon the position of its face area 485b relative to the drain bracket 488, will signify either the code number log. 0, or the code number log. 1. The point-symmetrical arrangement of the flux-conducting sections 485 relative to the magnet 483 is of the advantage that the key will be reversible. If somewhat larger stray fluxes can be tolerated, it will be possible to use instead of individual magnets 483 either an integral, plate-shaped magnet or, in order to obtain smaller stray fluxes, to use an integral plate of magnetizable material which will be permanently magnetized only at the data locations.

Similar to FIG. 47, FIG. 50 depicts an improved embodiment of the zone of the reading head containing the Hall generator in a cut view. The Hall generator H of thickness c is embedded in two flux-conducting platelets 482a, 482b that have assumed the function of the drain bracket and which, in turn, are embedded in non-magnetic material 484.

The Hall generator may, furthermore, in all embodiments, be replaced by another, magnet-sensitive semiconductor, f.i. a field plate, since the proposal as per invention may be realized with any magnet-sensitive semiconductor.

I claim:

1. Key-operated lock, comprising a reading head with a Hall generator, the magnetic inductance of said Hall generator varying in dependence upon the position of the key provided along its axis with successively arranged for magnetically readable data locations, wherein the signal voltage of said key, which depends upon the momentary value of the inductance is compared by a receiver circuit with stored data as set, the receiver circuit, in case of matching data actuating the mechanical latching device of the lock, characterized by each magnetically readable data location (I1, I2) of the key forming a minimum bivalent (dual) code and by each data location (I) being succeeded by a magnetically readable time-pulse plane (T) which controls the processing in the receiver circuit of that data location previously read out by the Hall generator in the reading head.

2. Lock as per claim 1, characterized by the Hall generator (H) being located within an air gap of a loop-like closed yoke consisting of flux-conducting sections (11a, 11b, 11c) and of two magnets (13, 14) arranged in symmetry relative to the Hall generator (H), the magnetic fluxes of said magnets cancelling each other prior to introduction of the key body (12), and by each data location (J1, J2) consisting of a magnetically conducting coded segment (15a, 15b) which will effect a magnetic shunt assymetric relative to the Hall generator (H) when the key body (12) is being introduced into the central aperture of the yoke, said aperture being delimited by the flux-conducting sections (11a, 11b, 11c) and the magnets (13, 14), and characterized by the position of the respective shunt relative to the Hall generator (H) determining the direction of the magnetic flux through the Hall generator, thus defining the respective code number of the appurtenant data location, (FIG. 1 to FIG. 5).

Figure 1:
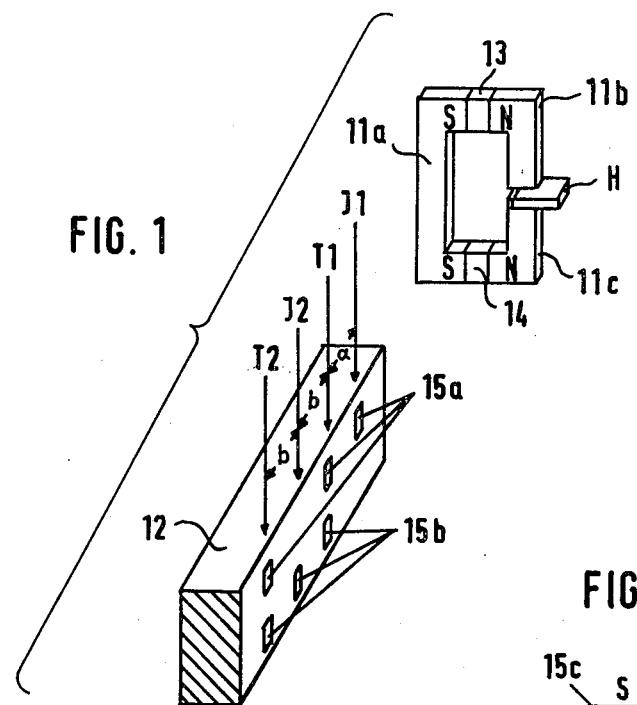
Figure 6:
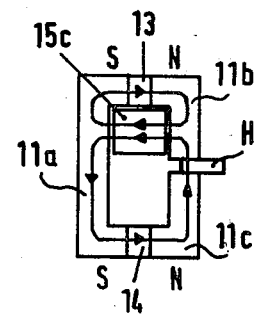
Figure 2:
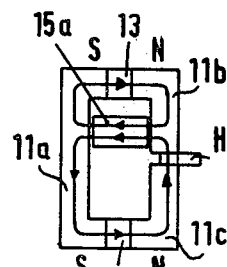
Figure 3:
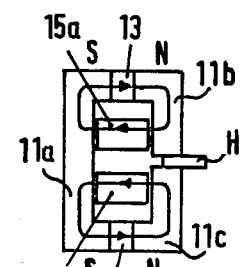
Figure 4:
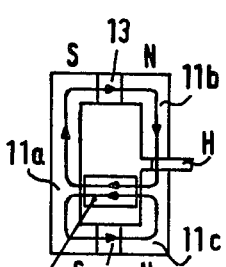
Figure 5:
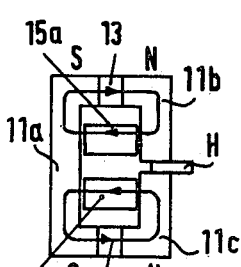

3. Lock as per claim 1 or 2, characterized by each timing-pulse plane (T1, T2) being formed by two coded segments (15a, 15b) in the key body (12), said coded segments effecting in the yoke two shunts which are symmetrical relative to the Hall generator (H), (FIGS. 3, 5).

4. Lock as per claim 3, characterized by the two coded segments for determining the timing-pulse plane being combined into one coded unit (136), (Compare FIG. 13).

Figure 13:
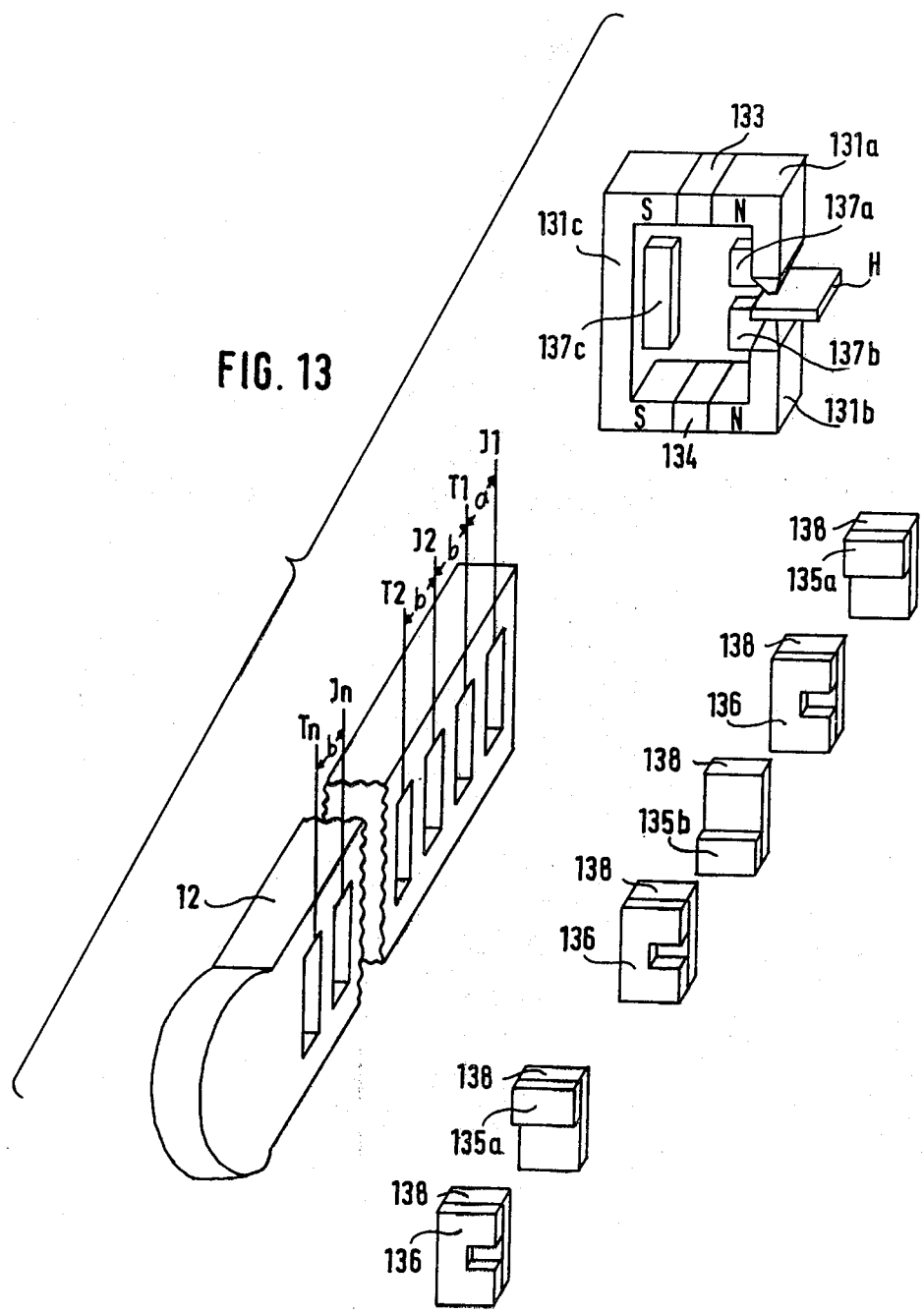
Figure 14A:
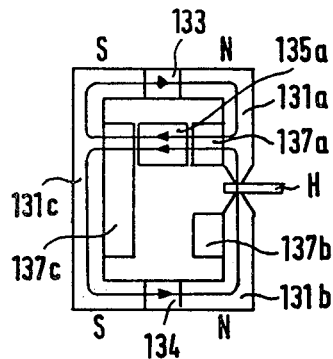
Figure 16A:
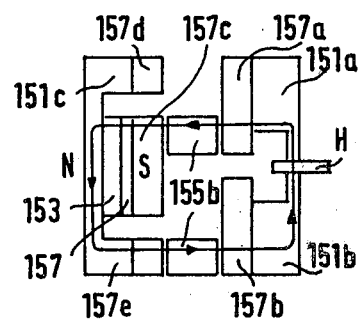
Figure 14B:
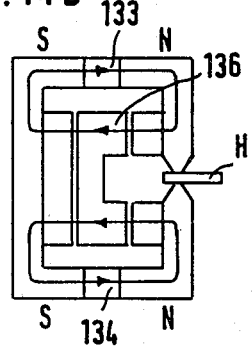
Figure 16B:
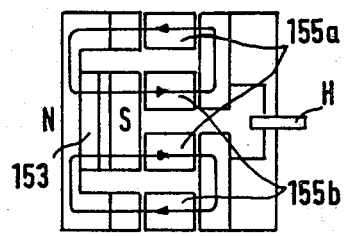
Figure 14C:
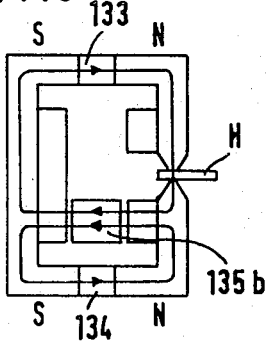
Figure 16C:
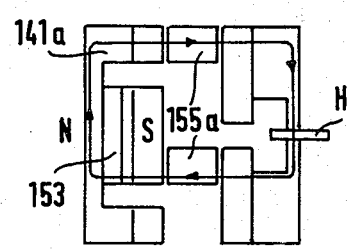

5. Lock as per claim 2, characterized by the cross sectional area of the flux sections (131a, 131b) decreasing in the direction of the Hall generator (H) and by providing at the loci of the shunts effected by the coded segments thin, magnetically conducting, sensing brackets (137a, 137b, 137c). (FIGS. 13, 14).

6. Lock as per claim 1, characterized by the Hall generator (H) being located within an air gap between two flux-conducting sections (151a, 151b) arranged symmetrical relative to the Hall generator (H), with an approximately U-shaped additional flux-conducting section (151c) so arranged opposite to these two sections, that an air gap is left open to allow inserting of the key body (12), the last-named flux section supporting at the center of its inner side a magnet (153) with its magnetic axis set perpendicular to the longitudinal axis of this additional flux section (151c), and by each data location of the key comprising two magnetically conductive coded segments (155a, 155b) which, when the key body (12) is being inserted into the air gap, will close the magnetic circuit assymetrical relative to the Hall generator (H), and characterized by the position of the coded segments relative to the Hall generator, determining the direction of the magnetic flux through the Hall generator, thus defining the respective code number of the appurtenant data location.

7. Lock as per claim 6, characterized by each timing pulse plane being formed by a coded unit (155a+b) within the key body (12) which unit will close two magnetic circuits symmetrical relative to the Hall generator (H).

8. Lock as per claim 1, characterized by the distance (a) of the first timing pulse plant (T1) from the first data location (I1) being greater than the mutual distance (b) of subsequent data locations and the timing pulse planes (FIG. 15).

Figure 18:
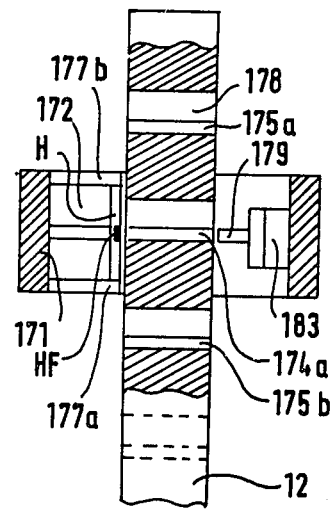
Figure 19:
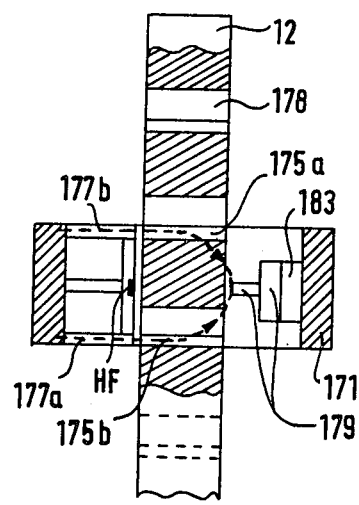
Figure 20:
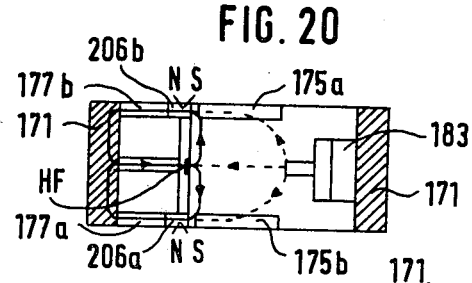
Figure 21A:
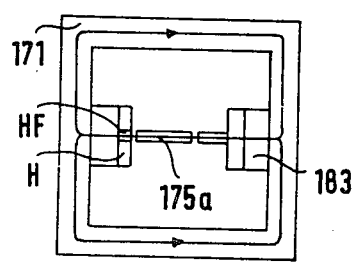
Figure 21B:
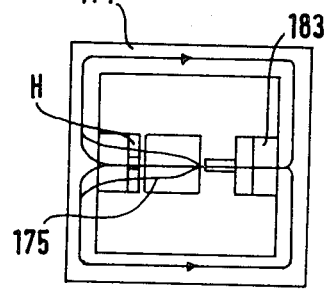

9. Lock as per claim 1, characterized by the reading head comprising a loop-like closed yoke of a width approximately equal to the mutual distance of the data locations and having a cutout for inserting the key body (12), and by the Hall generator (H) being located at the center of one side of the cutout in such a manner that it will rest with its surface sensitive to the magnetic field parallel to the direction of displacement of the key body (12) upon a sensing bracket (172) connecting the Hall generator to the adjacent leg of the yoke, and by providing at the center of the other side of the cutout of yoke (171) a magnet (183) with its magnetic axis at right angle to the direction of displacement, and characterized by each data location (I1 to In) comprising a magnetically conductive coded segment (175a, 175b, 175) serving to close the magnetic circuit between magnet (183) and Hall generator (H), with the cross-sectional area of its face side determining the magnitude of inductance through the Hall generator (H), thus defining the respective code number of the appurtenant data location, (FIGS. 17 to 19).

10. Lock as per claim 1, characterized by the reading head consisting of an approximately U-shaped yoke (351) of a width (b) approximately equal to the mutual distance of data locations (I1 to I6) on key body (12), one leg of said yoke containing a magnet (353) with its magnetic axis oriented at right angle to the plane of the lateral leg, the other leg carrying at its center upon a sensing bracket (352) the Hall generator (H) with its surface sensitive to the magnetic field arranged parallel to the direction of displacement of key body (12), and characterized by each data location (I1 to I6) comprising an approximately U-shaped magnetically conductive coded segment (355a, 355b) serving to close the magnetic circuit between magnet (353) and Hall generator (H) with the cross-sectional are of its face side determining the magnitude of inductance through the Hall generator (H), thus defining the respective code number of the appurtenant data location (FIGS. 35, 36).

11. Lock as per claim 10, characterized by the coded segments (375a, 375b) being constructed in the shape of strips and by their length determining the magnitude of inductance through the Hall generator (H), (FIGS. 37a, 37b).

12. Lock as per claim 1, characterized by the reading head consisting of an approximately U-shaped yoke (381) of a width approximately equal to the mutual distance of the data locations (I1 to I8) on the key body (12), the legs of said yoke carrying one respective magnet (383, 384) and the lateral leg of which carrying at its center upon a sensing bracket (382) the Hall generator (H) with the magnet-sensitive surface of said Hall generator (HF), arranged parallel to the direction of displacement, and characterized by the two magnets (383, 384) having opposed polarity, and by each data location comprising two coded segments (385a, 385b) which will assymetrically close the magnetic flux of both magnets over the sensing bracket (352), and further characterized by the location of the interstice (380) between the two coded segments (385a, 385b) determining the direction of the magnetic flux through the Hall generator (H), thus defining the respective code number of the appurtenant data location (FIGS. 38 to 43).

13. Lock as per claim 1, characterized by the reading head comprising a loop-like closed yoke (441) of a width approximately equal to the mutual distance of the data locations, and provided with a cutout for inserting the key body (12), and by the Hall generator (H) being located at the center of one side of the cutout on a sensing bracket (442) connecting the Hall generator to the adjacent leg of the yoke, with the surface of said Hall generator sensitive to the magnetic field arranged herein parallel to the direction of displacement of the key body (12), and further characterized by a flux-conducting section (449) located at the other side of the cutout, and by each data location (I1 to I5) consisting of a magnet (443) with flux-conducting sections 445a, 445b) provided at both ends serving to close the magnetic circuit between this magnet (443) and the Hall generator (H), with the cross-sectional area of their face sides determining the magnitude of inductance through the Hall generator (H), thus defining the respective code number of the appurtenant data location (I1 to In), (FIGS. 44 to 47).

14. Lock as per claim 1, characterized by the reading head comprising an approximately U-shaped yoke (481) of a width in the direction of displacement of the key body, approximately equal to the mutual distance of the data locations (I1 to I6), by one leg of the yoke carrying on a sensing bracket (482a, 482b) at its center, the Hall generator (H) with its magnet-sensitive surface arranged parallel to the direction of displacement, and characterized by the other leg of the yoke (481) carrying a flux-conducting section (489) arranged opposite to the Hall generator (H), by the lateral leg of yoke (481) being provided with a drain bracket (488) oriented parallel to the direction of displacement, and by each data location (I1 to I8) consisting of a magnet (483) with flux-conducting sections (485) provided at its two ends, one of said flux-conducting sections being provided with a face side (485a) cooperating with the Hall generator (H) and also, at a right angle to said face side, with a face side (485b) cooperating with the drain bracket (488), with the other flux-conducting section cooperating with flux-conducting section (489) at the other leg of yoke (481), and further characterized by the position of the further face side (485b) of the first flux-conducting section relative to the drain bracket (488) determining the magnitude of inductance through the Hall generator (H), thus defining the code number of the appurtenant data location (FIGS. 48 to 50).

15. Lock as per claim 14, characterized by the flux-conducting sections (485) being arranged on the magnet (483) of the key body in symmetry as to the point of their location.

16. Lock as per one of the claims 13 to 15, characterized by each data location (I1 to I6) consisting of a partially magnetizable magnetic material (465a, 465b) (FIG. 46).

17. Lock as per one of the claims 9 10, 12, 13 or 14, characterized by the pulse planes being defined by the inductance corresponding to the stray flux intersecting the Hall generator (H) between the individual data locations.

18. Lock as per one of the claims 9 10, 12, 13 or 14, characterized by the data locations (I1 to In) succeeding each other on the key body (12) at a fixed distance (b), and by providing, in the direction of displacement and at both sides of the magnet-sensitive surface (HF) of Hall generator (H), drain brackets (f.i. 177a, 177b or 487a, 487b) corrected at a distance (b/2) which is one half of the aforenoted distance (b) to the yoke (f.i. 171 or 481), said drain brackets serving to drain the stray flux of the magnet (f.i. 183), through i.e. coded segments (f.i. 175a, 175b or 484) of successive data locations (f.i. I2, I3).

19. Lock as per claim 18, characterized by the arrangement, in the zone of the drain brackets (f.i. 177a, 177b; 487a, 487b) and symmetrical to the Hall generator (H), of one respective compensating magnet each (f.i. 206a, 206b; 486b 486b) for the stray flux of the magnets (e.g. 183; 483).

20. Lock as per one of the claims 9, 10, 12, 13 or 14, characterized by the coded segments (365b in FIG. 36c, 375b in FIG. 37c) being arranged in unfolded symmetry on two opposed surfaces of the key body (12).

21. Lock as per claim 1, characterized by the Hall generator (H) being embedded without an air gap between two flux conducting platelets (482a, 482b) of approximately equal cross sectional area (FIG. 50).

22. Lock as per claim 1, characterized by the signal voltage supplied by the Hall generator (H) being converted in operational amplifiers with hysteresis characteristics (OP2, OP3), into digitally processable voltage levels.

* * * * *